United States Patent
Otto et al.

(10) Patent No.: US 8,235,193 B2
(45) Date of Patent: *Aug. 7, 2012

(54) ANNULARLY MOUNTED MULTIPLE FRICTION MEMBER SYNCHRONIZING AND ENGAGING CLUTCH

(75) Inventors: John R. Otto, Gansevoort, NY (US);
Gerald T. Scanlon, Poultney, VT (US);
David C. Covey, Fairfax, VA (US);
Russell R. Otto, Gansevoort, NY (US);
Michael G. Holland, Saratoga Springs, NY (US)

(73) Assignee: Ottonomous Solutions LLC, Norfolk, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/734,349

(22) PCT Filed: Oct. 27, 2008

(86) PCT No.: PCT/US2008/012154
§ 371 (c)(1),
(2), (4) Date: Jun. 29, 2010

(87) PCT Pub. No.: WO2009/055056
PCT Pub. Date: Apr. 30, 2009

(65) Prior Publication Data
US 2010/0263980 A1 Oct. 21, 2010

Related U.S. Application Data

(60) Provisional application No. 61/000,630, filed on Oct. 26, 2007.

(51) Int. Cl.
*F16D 23/04* (2006.01)
(52) U.S. Cl. .................................. 192/53.1; 74/339
(58) Field of Classification Search ............... 192/53.1, 192/53.363, 53.364, 53.5, 53.3, 52.1, 52.2; 74/339
See application file for complete search history.

(56) References Cited

U.S. PATENT DOCUMENTS 1,605,780 A * 11/1926 Ristau .......................... 192/53.5
1,681,714 A * 8/1928 Tullar .......................... 192/53.5

* cited by examiner

*Primary Examiner* — Rodney Bonck
(74) *Attorney, Agent, or Firm* — Wooten & Shaddock, PLC

(57) ABSTRACT

A gear synchronizing system having a component carrier, wherein the component carrier accepts a splined shaft therethrough and interact with the splined shaft to allow transfer of rotation between the splined shaft and the component carrier while also allowing the component carrier to slide axially along the splined shaft relative to an associated friction plate. The component carrier includes a plurality of friction members pivotably coupled within walled recesses of the component carrier, such that when the component carrier is urged toward the associated friction plate, at least a portion of the contact surface of the friction members initially contacts a surface of the friction plate and, as the component carrier continues to be urged toward the associated friction plate, each friction member is rotated, such that at least a portion of the contact surface of each friction member continues to contact a surface of the friction plate.

20 Claims, 24 Drawing Sheets

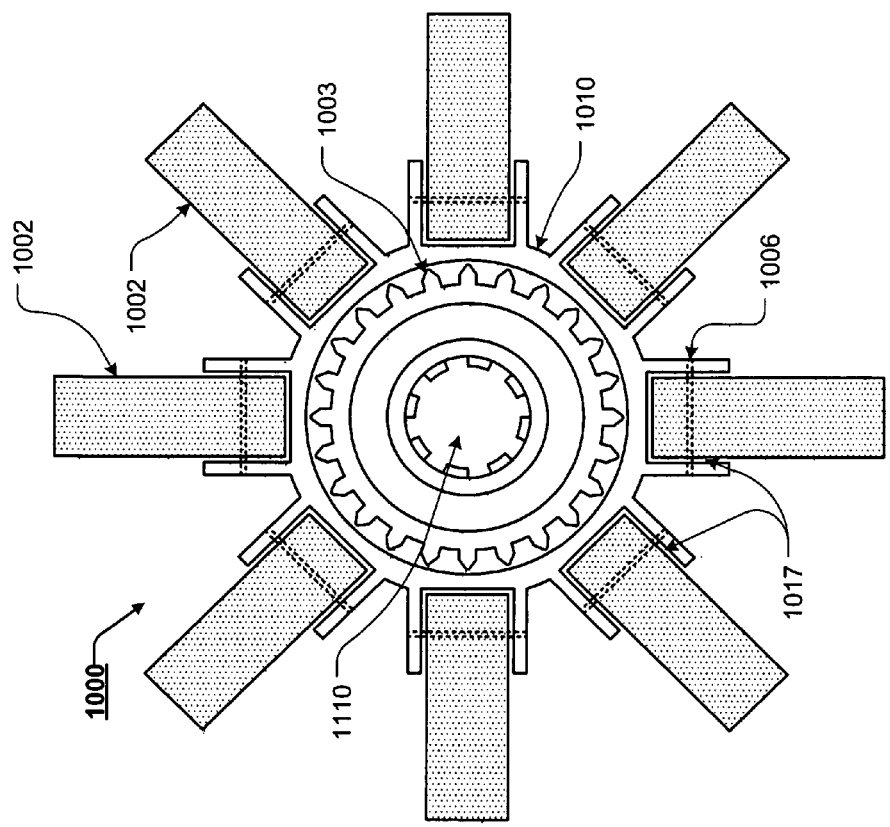
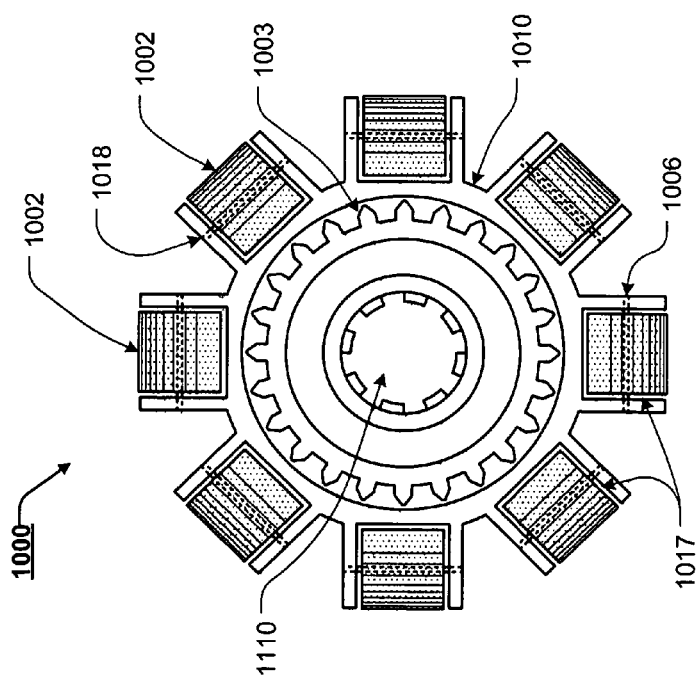
FIG. 1A
FIG. 1B

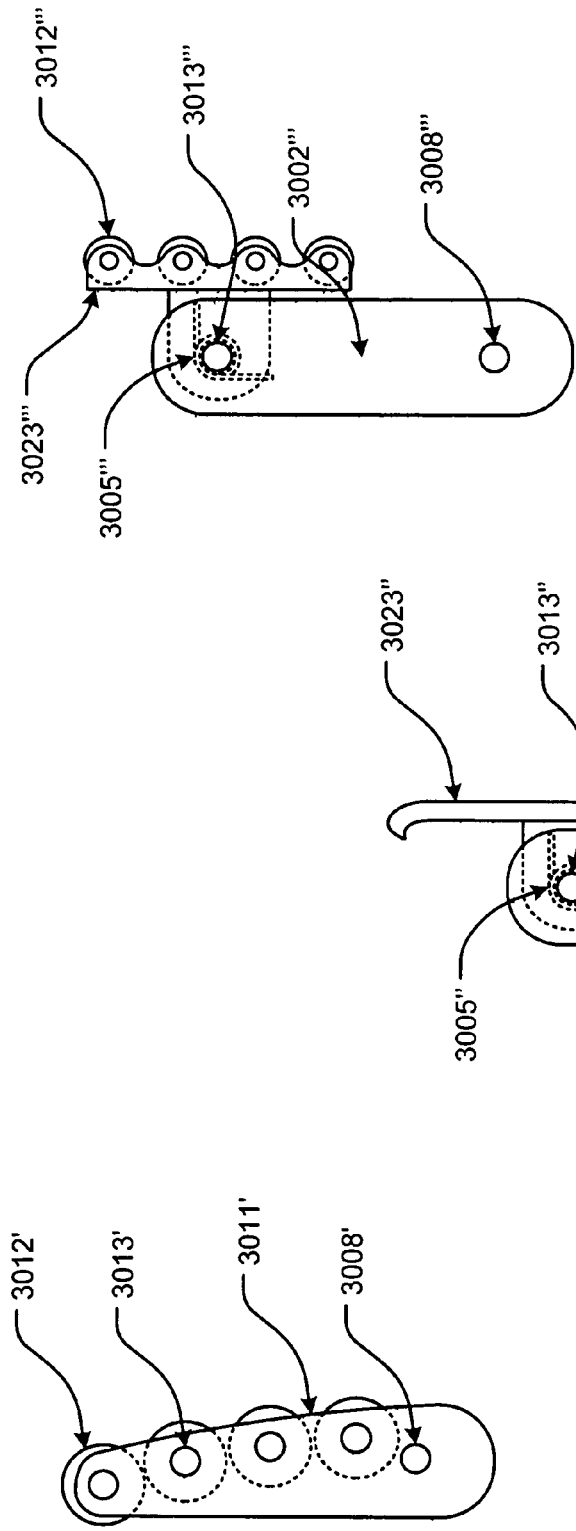

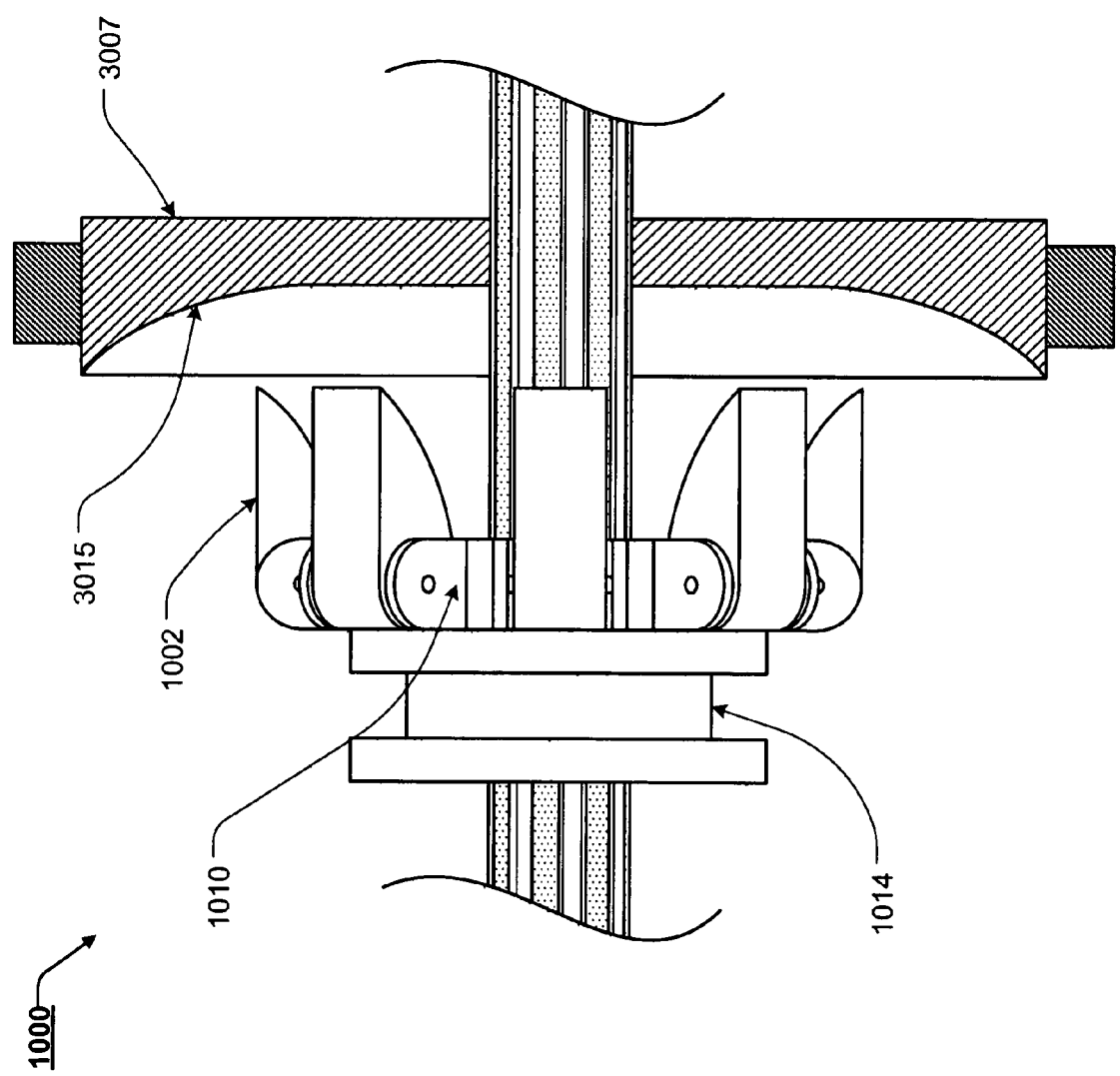

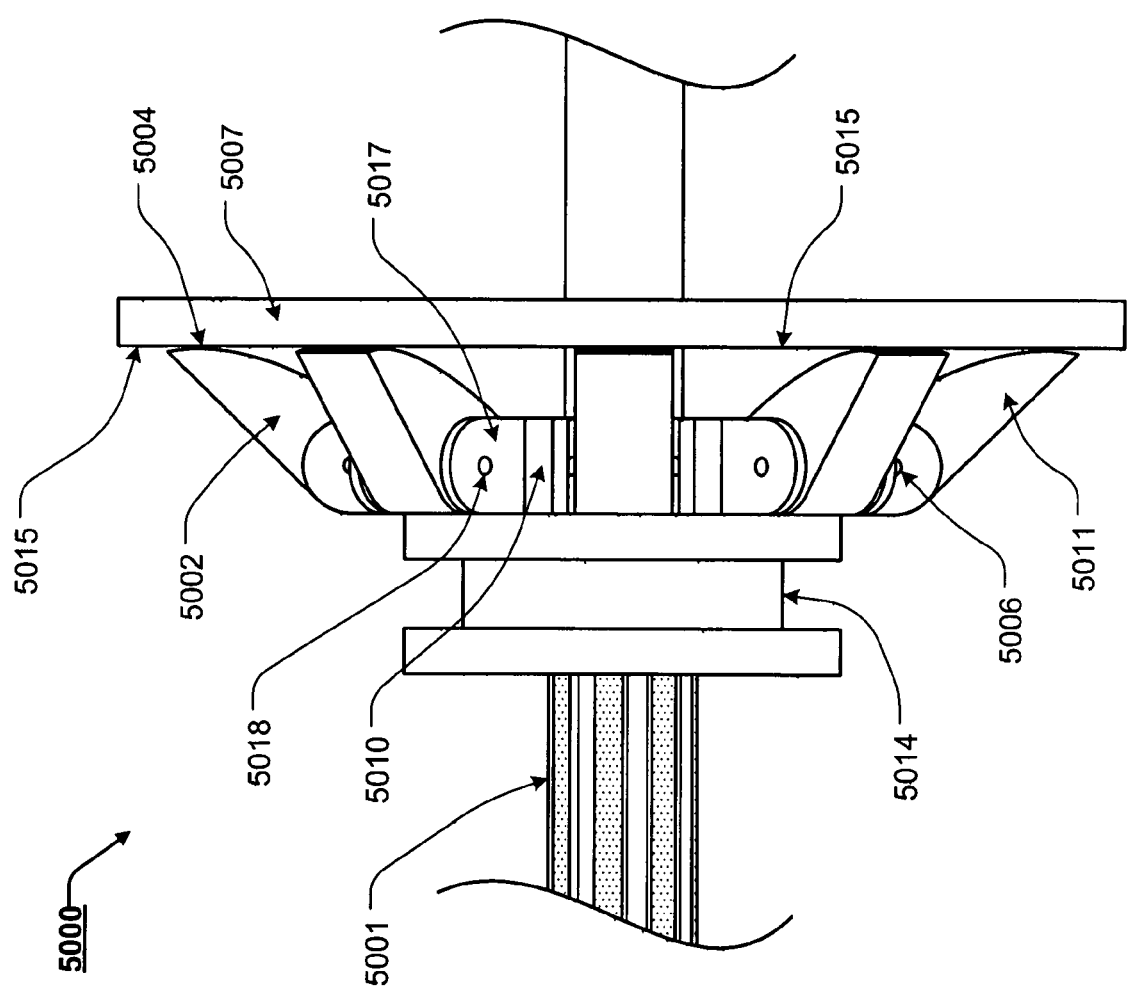

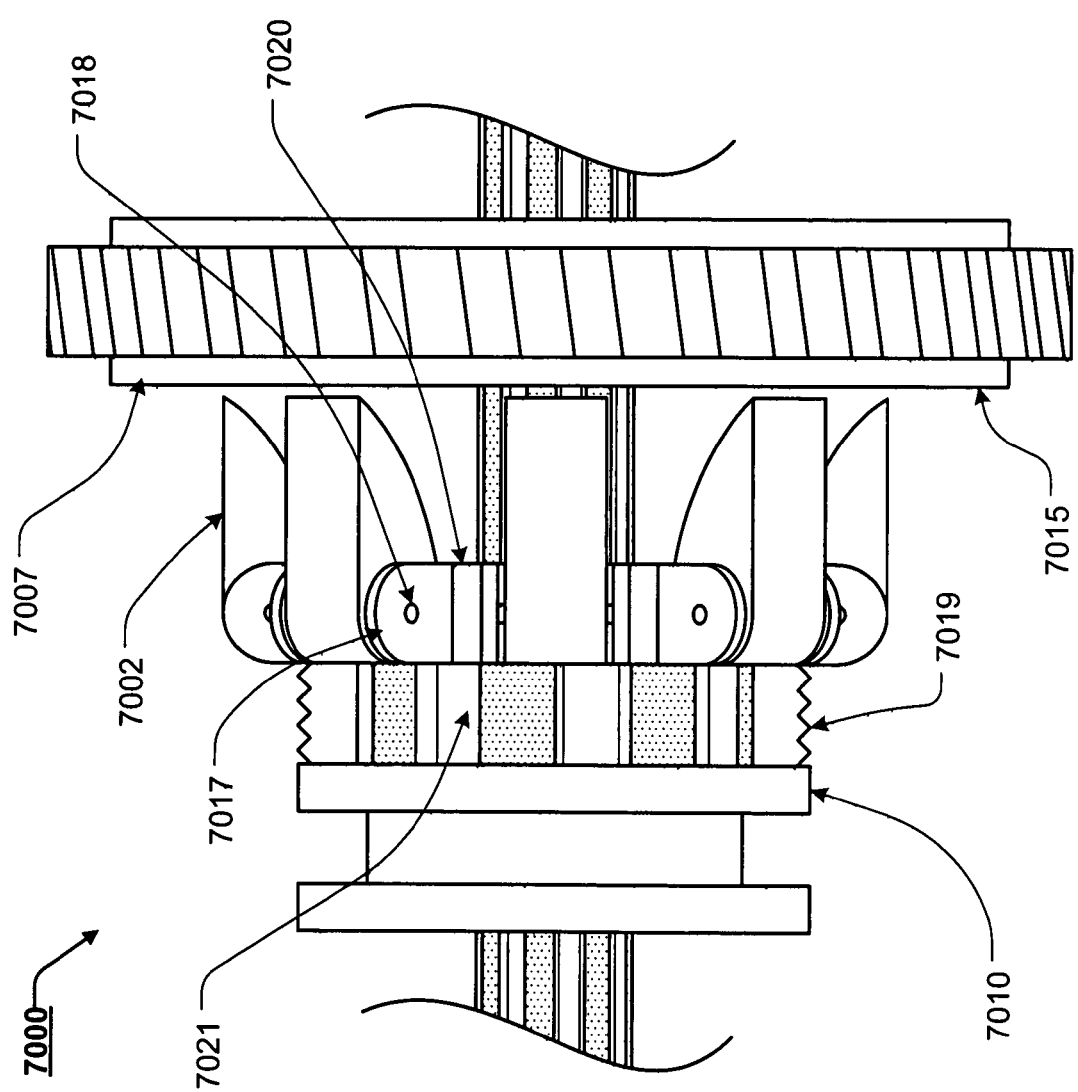

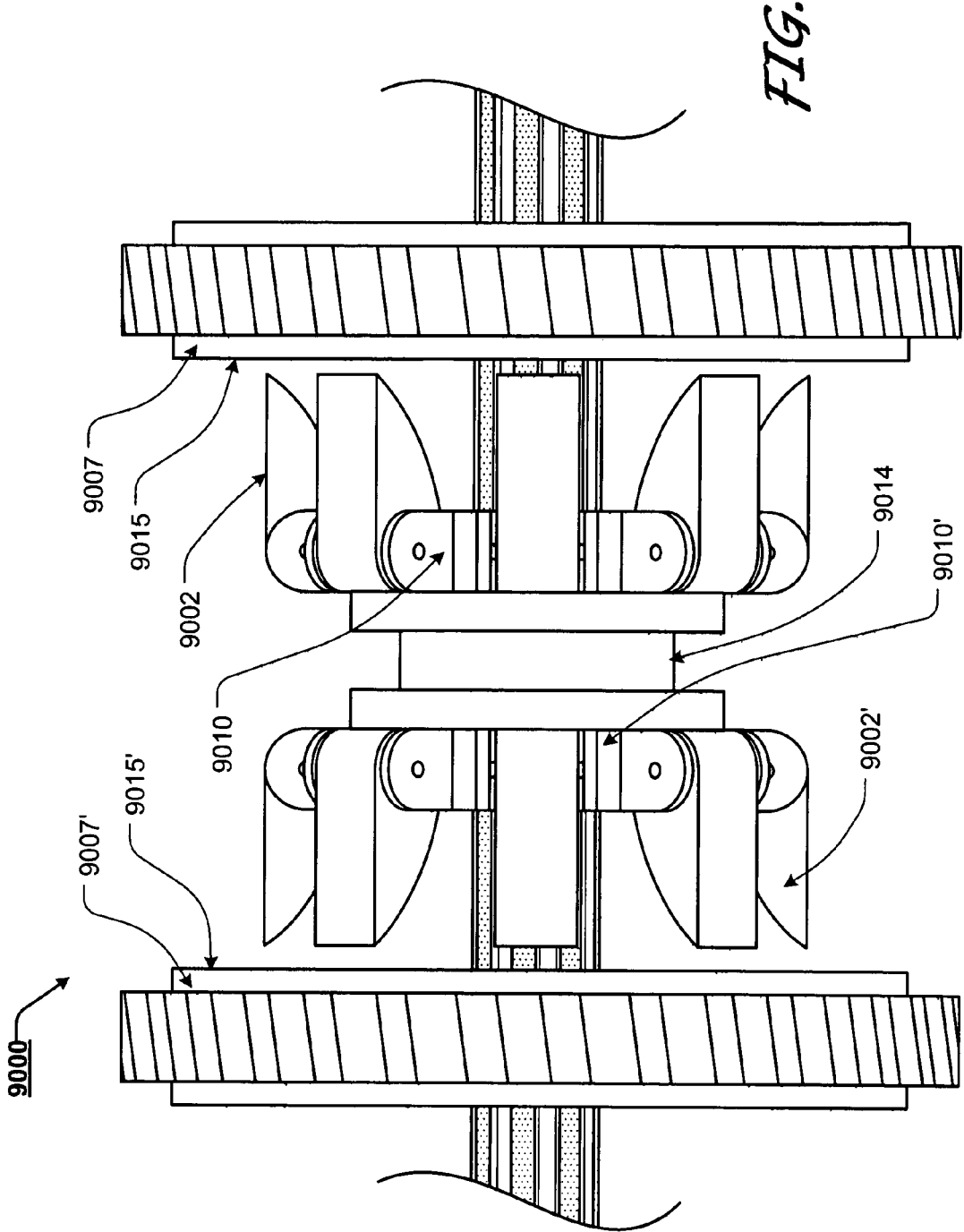

ANNULARLY MOUNTED MULTIPLE FRICTION MEMBER SYNCHRONIZING AND ENGAGING CLUTCH

CROSS-REFERENCE TO RELATED APPLICATIONS

This patent application claims the benefit of U.S. Patent Application Ser. No. 61/000,630, filed Oct. 26, 2007, the entire disclosure of which is incorporated herein by reference.

BACKGROUND OF THE INVENTION

1. Field of the Invention

This invention relates generally to synchronizing clutches. In particular, the present invention relates to a multiple friction member synchronizing clutch.

2. Description of Related Art

The addition or removal of frictional force is controlled by mechanical energy/force components, usually either by a single diaphragm-type spring or annular series of rocker arms attached to varying spring types, whose interaction with the other component is controlled by an axially/linearly movable throw-out bearing and actuation arm mechanism.

Generally, a friction member clutch is used to frictionally synchronize and connect the rotational speeds of two rotating components. Most other friction clutches utilize direct plate-to-plate contact. In these types of known clutches, frictional force is controlled by mechanical components, typically either a diaphragm-type spring, curved face torsion forced pressure members, or rocker arms attached to compression or tension springs on one rotating component whose interaction with the other component is controlled by a throw-out bearing.

Regardless of the mechanical energy components involved, the initial position of the system is with the rotation plates in contact because the spring components are highly preloaded for their initial position of final engagement.

In the case in which the clutch assembly uses a diaphragm spring, an axially mounted throw-out bearing is connected to radially inward-pointing fingers of the spring while the base of the spring, along its circumference, is attached to the pressure plate, connected via splines to its rotating shaft. As the throw-out bearing is moved axially about the shaft the diaphragm spring relieves force on opposing component by pulling the plate/diaphragm spring/bearing assembly away, reducing their normal force, friction and thus their rotation. Conversely, the throw-out bearing can also be moved axially to allow force from the spring to move and then press the plate assembly back into the opposing component, resuming friction and rotation. Many variations of the diaphragm spring assembly and its degrees of freedom/movement possibilities are popular in passenger vehicles.

In the case in which the clutch assembly uses rocker arms and springs, the springs are mounted in a housing, which pulls both plates together. Depending on the spring type (compression, tension, torsion, etc.) the look and specific geometry of the rocker arm and plate will be affected. The rocker arms are connected to the springs, the throw-out bearing, and the pressure plate housing. As the throw-out bearing moves axially along the shaft, the rocker arms act on the springs and rocker arm mechanism, relieving the forces between the pressure and fly plates and discontinuing the rotation. Conversely, as the throw-out bearing returns to its original position the springs reintroduce forces between the plates and friction/rotation resumes. The rocker arm type clutch assembly is popular with vehicles that carry larger loads such as tractor-trailers and tractors.

SUMMARY OF THE INVENTION

Unlike direct plate-to-plate contact friction clutches, the annularly mounted multiple friction member synchronizing and engaging clutch of the present invention provides a way to frictionally match and connect the rotational velocities and forces of different rotating components in a revolving system.

One shortcoming of known synchronizers is that their design is primarily for use in connection with low rotational loads. This typically requires manipulation of the engine clutch to transfer excess rotation from the engine as frictional energy in the clutch plate. This is most noticeable when attempting to change gears effectively or while executing low speed maneuvers, such as, for example, while creeping in traffic or maneuvering in a parking lot.

Furthermore, the clutches of modern planetary transmission systems are designed to be either completely engaged or disengaged, thus instigating wear between ingressive gear changes. The rotating clutch plate of the interesting gear of the planetary transmission must be stopped by some form of mechanical breaking, i.e., face-to-face interaction with a fixed clutch or breaking via a caliper.

The most fundamental purpose of a clutch is to couple and/or synchronize the rotations of two rotating components. The synchronizing clutch of the present invention provides for the synchronization and gradual application of one components rotation with another. The utilization of multiple friction members patterned annularly on one of the rotating components allows for many advantages.

By utilizing the synchronizing clutch of the present invention, gradual transfer of rotation by frictional slipping of the component's material over a more controlled actuation distance and with a superior force/energy application mechanism may optionally be achieved. Thus, the initial energy stored in the springs of the multiple friction member synchronizing clutch is less than that of the springs in known clutch designs rather than just friction slippage via normal/frictional force control from an already overpowered force/energy mechanism (spring). The friction members are also not limited by component carrier mounting orientation, ranging anywhere between a vertical, radial orientation and an orientation perpendicular to both the radial line and the rotation axis.

By utilizing the synchronizing clutch of the present invention, rotational inertia will be reduced. Known clutch designs utilize heavy pressure plates, large springs and associated walled recesses and other assembly components which, even at a smaller scale, by design are obtrusive to rotational inertia because of the spinning mass being located close to or around the component's circumference, far from the axis of rotation. The synchronizing clutch of the present invention is a more rotationally efficient component, with the spinning masses residing much closer to the rotation axis, reducing inertial losses.

The synchronizing clutch of the present invention allows for multiple options for final engagement based on the load and rotation situation. Known clutch assemblies allow mostly for friction only final engagement, which the multiple friction member synchronizing clutch is capable of doing. However, the multiple friction member synchronizing clutch is also capable of carrying interference type coupling, meaning that gear-like teeth called "dog teeth" may optionally be utilized to hard-couple the rotating components together after the frictional engagement has synchronized most of the initial dissimilar rotations.

The final engagement of the embodiments of the synchronizing clutch of the present invention may optionally be modified with slider components to gain higher final engagement efficiencies. For frictional final engagement, the slider components provide an additional linearly driven force situation. For interference engagement, the slider components allow the dog teeth to remain out of the way while the friction members complete their rotations and force against the opposing friction medium. Once the friction members have completed their rotation, through continued axial actuation, the slider component exposes the dog teeth allowing them to complete the engagement.

The synchronizing clutch of the present invention can also be built with a rotationally shock absorbing component that would reduce the sudden jolts associated with frictional engagement.

Because of the multiple friction member synchronizing clutch's better control over frictional force relative to application of force with the friction members, different friction materials may optionally be used on the same friction plate to make different radial friction zones. These friction zones, as well as the plate, may optionally be surfaced with a pattern that additionally controls the direction of the friction force vector components.

The actuating system of the invention is more versatile than that of known clutch designs. The previous clutch design's home position, dictated by the force mechanism used, is generally with the rotation components engaged and the user (whether it be human or computer input) actuator disengaged, thus upon user engagement of the actuator there is disengagement of rotating components. This is called negative engagement. The invention's home position is with the rotating components disengaged and the actuator disengaged. Thus, upon user engagement of the actuator there is engagement of the rotating components. This is called positive engagement. The synchronizing clutch of the present invention can also operate effectively as a negative engagement mechanism.

This invention separately provides a multiple friction member synchronizing clutch that allows one shaft to synchronize two separate outputs (or, conversely, synchronize one output to two inputs) with a single connecting center hub. Known clutch assemblies can only connect two rotations, input to output; and in some cases, multiple outputs at the same time (such as the double position of a tractor drive clutch and power take off). The multiple friction member synchronizing clutch can service two separate outputs for a given input because its friction connection face may optionally be mirrored within the same component carrier along the shaft axis (making for a "double sided" multiple friction member synchronizing clutch assembly, as illustrated in FIG. 9). This allows the doubly multiple friction member synchronizing clutch mounted component carrier to be actuated in either direction along the shaft axis to connect the rotations of one system or the other based on the (extreme) axial position of the synchronizing clutch center carrier.

The present invention relates generally a multiple friction member synchronizing clutch that frictionally synchronizes and connects the components of a rotating system via annularly patterned friction members around one component (actuated or stationary) while the opposing component contains a frictional surface for the friction members to act upon. The friction members rotate about an axis, such as, for example, a pin or the like, and are kept in their initial position while rotationally resisted by a generated torque.

As the rotating components are moved or actuated axially toward each other, the friction members of the one component begin to frictionally interact with the friction surface of the other component thus transferring the rotation via frictional means. The friction members rotate about their rotation pins, being forced into the friction surface via the applied torque, instigating the frictional force and thus rotation transfer. When the components are finally engaged they may be, but are not limited to, connection either via frictional pressure plate interaction or interference engagement, such as, for example, dog tooth engagement.

In various, non-limiting embodiments of this invention, the synchronizing clutch is utilized in a straight drive transmission to synchronize the rotation of the transmission lay-shaft, or input shaft, with the rotation of the output shaft before transmitting rotation from the engine via the engine clutch.

In these embodiments, as the shifting lever, or actuator, is moved, the friction members are pressed to connection with a friction medium and begin to rotate about their pin joints. The moment about the friction member's rotation pins forces them into the friction medium causing an interaction between the surface of the friction member and the friction medium. The friction is translated into rotational motion prior to final drive coupling thereby allowing the driver, or computer, to leave engine clutch engaged and move the vehicle by virtue of the position of the shifting lever, or actuator.

Thus, the synchronizing clutch of the present invention strengthens the overall synchronizer system, motions, and actions to carry at least part, and potentially all, of the potential load from an engine clutch, thus allowing the shifting system to both change gear ratios and control power connection between the engine and transmission.

In other, non-limiting embodiments of this invention, the synchronizing clutch is utilized as the fixed component of the planetary gear selection action of a planetary transmission system. In these embodiments, a torque/moment generated about the rotation pin joint provides rotational resistance of the friction member during operation. As the shifting lever, or actuator, is moved, the friction members are pressed to connection with the friction medium and begin to rotate about their rotation pin joints. The moment about the friction member's rotation pins forces them into the friction medium causing an interaction between the surface of the friction member and the friction medium. This interaction is what slows the selector plate to a stop, allowing the selection of the planetary gear ratio.

Thus, in these embodiments, gradual introduction of friction is allowed to occur, thus reducing wear and allowing manual planetary gear ratio selection via actuation of the shifting mechanism.

Accordingly, this invention provides a multiple friction member synchronizing clutch.

This invention separately provides a way to frictionally match and connect the rotational velocities and forces of different rotating components in a revolving system.

This invention separately provides a multiple friction member synchronizing clutch having annularly patterned friction members around one component.

This invention separately provides a multiple friction member synchronizing clutch having a frictional surface for the friction members to act upon.

This invention separately provides a multiple friction member synchronizing clutch that does not require a special component system to actuate the rotating components and may optionally be run by any linearly actuating system that is strong enough to overcome the forces needed to couple the components for the rotational load situation.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein:

FIG. 1A illustrates a front elevation view of a first exemplary embodiment of a synchronizing clutch according to this invention, wherein the friction members are illustrated in a neutral position;

FIG. 1B illustrates a front elevation view of a first exemplary embodiment of a synchronizing clutch according to this invention, wherein the friction members are illustrated in a final engagement position;

FIG. 3C illustrates a side elevation view of a third exemplary embodiment of a friction member according to this invention;

FIG. 3D illustrates a side elevation view of a fourth exemplary embodiment of a friction member according to this invention;

FIG. 3E illustrates a side elevation view of a fifth exemplary embodiment of a friction member according to this invention;

FIG. 3H illustrates exemplary interaction of a complementary curved friction plate surface with the curved surfaces of friction members, wherein the synchronizing clutch component carrier is illustrated in a neutral position;

FIG. 5 illustrates an additional exemplary embodiment of a synchronizing clutch according to this invention, wherein the synchronizing clutch component carrier is illustrated in an intermediate position;

FIG. 7A illustrates a side elevation view of an exemplary embodiment of a synchronizing clutch according to this invention, wherein the exemplary synchronizing clutch component carrier is illustrated in a neutral position;

FIG. 9 illustrates a side elevation view of an exemplary embodiment of a "double sided" multiple friction member synchronizing clutch assembly according to this invention, wherein the exemplary synchronizing clutch component carrier is illustrated in a neutral position.

DETAILED DESCRIPTION OF EXEMPLARY EMBODIMENTS

For simplicity and clarification, the design factors and operating principles of the synchronizing clutch according to this invention are explained with reference to various exemplary embodiments of a synchronizing clutch according to this invention. The basic explanation of the design factors and operating principles of the synchronizing clutch is applicable for the understanding, design, and operation of the synchronizing clutch of this invention.

It should be appreciated that the terms "clutch" and "synchronizing clutch" are used for basic explanation and understanding of the operation of the systems, methods, and apparatuses of this invention. Therefore, the terms "clutch" and "synchronizing clutch" are not to be construed as limiting the systems, methods, and apparatuses of this invention.

It should also be understood that the absence of specific potential hardware and general assembly items such as bolts, washers, nuts, balancing pieces, spacers, bearings etc. is intentional and the exact use of such specific components in conjunction with the invention is a design choice to be determined by the designing or manufacturing entity.

Figure 2A:
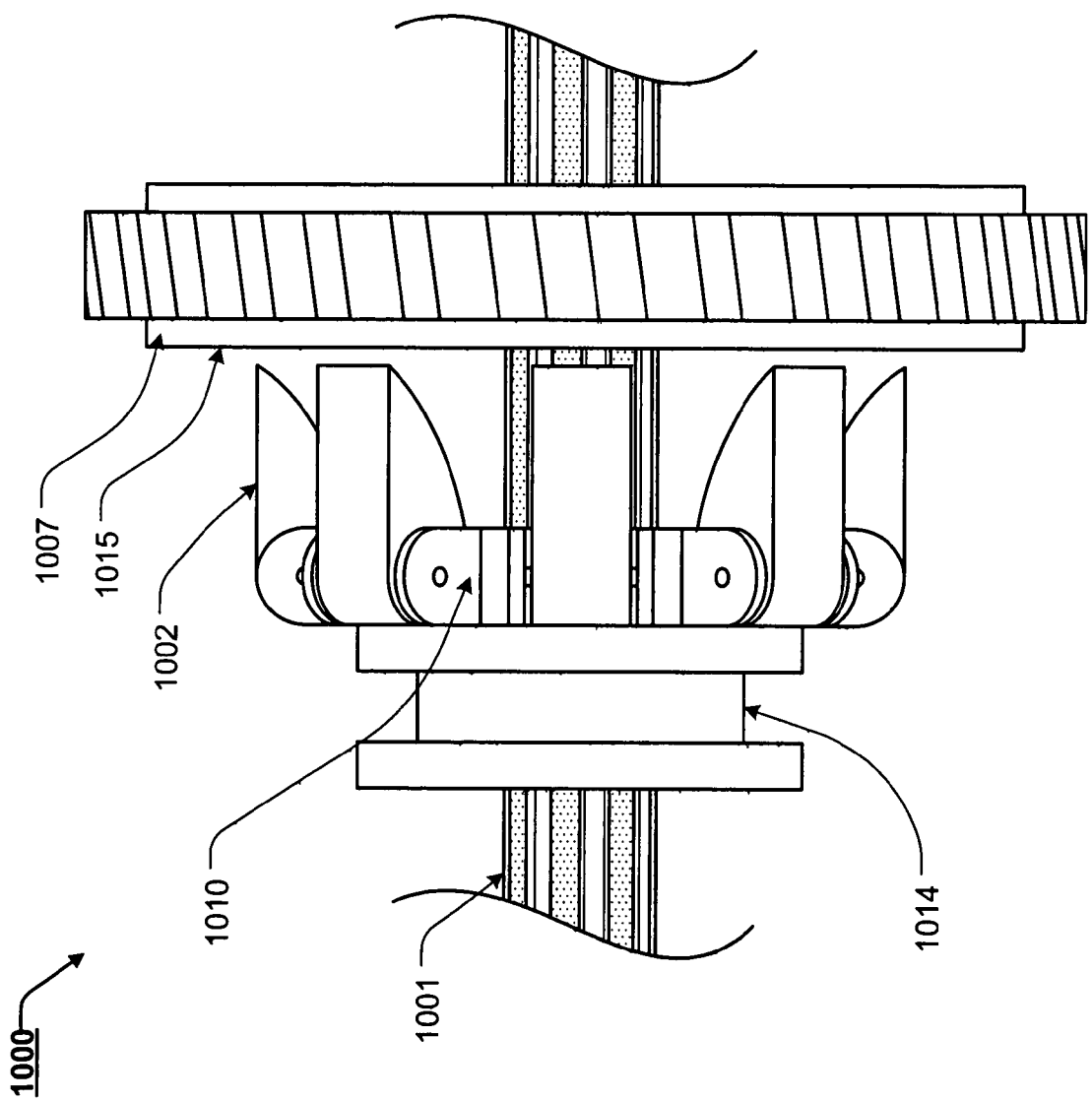
FIG. 2A illustrates a side elevation view of a first exemplary embodiment of a synchronizing clutch according to this invention, wherein the synchronizing clutch component carrier is illustrated in a neutral position.
Figure 2B:
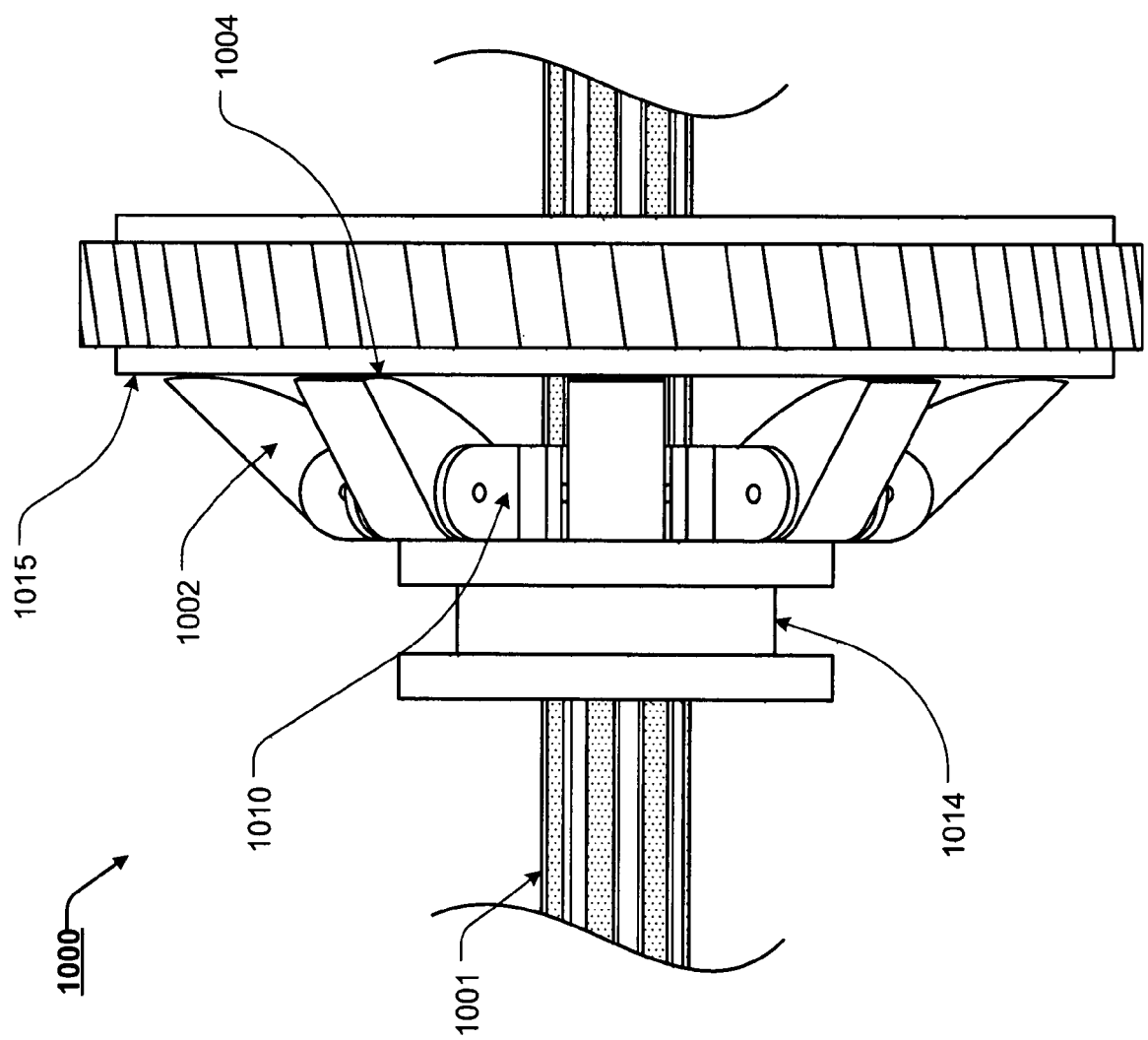
FIG. 2B illustrates a side elevation view of a first exemplary embodiment of a synchronizing clutch according to this invention, wherein the synchronizing clutch component carrier is illustrated in an intermediate position.
Figure 2C:
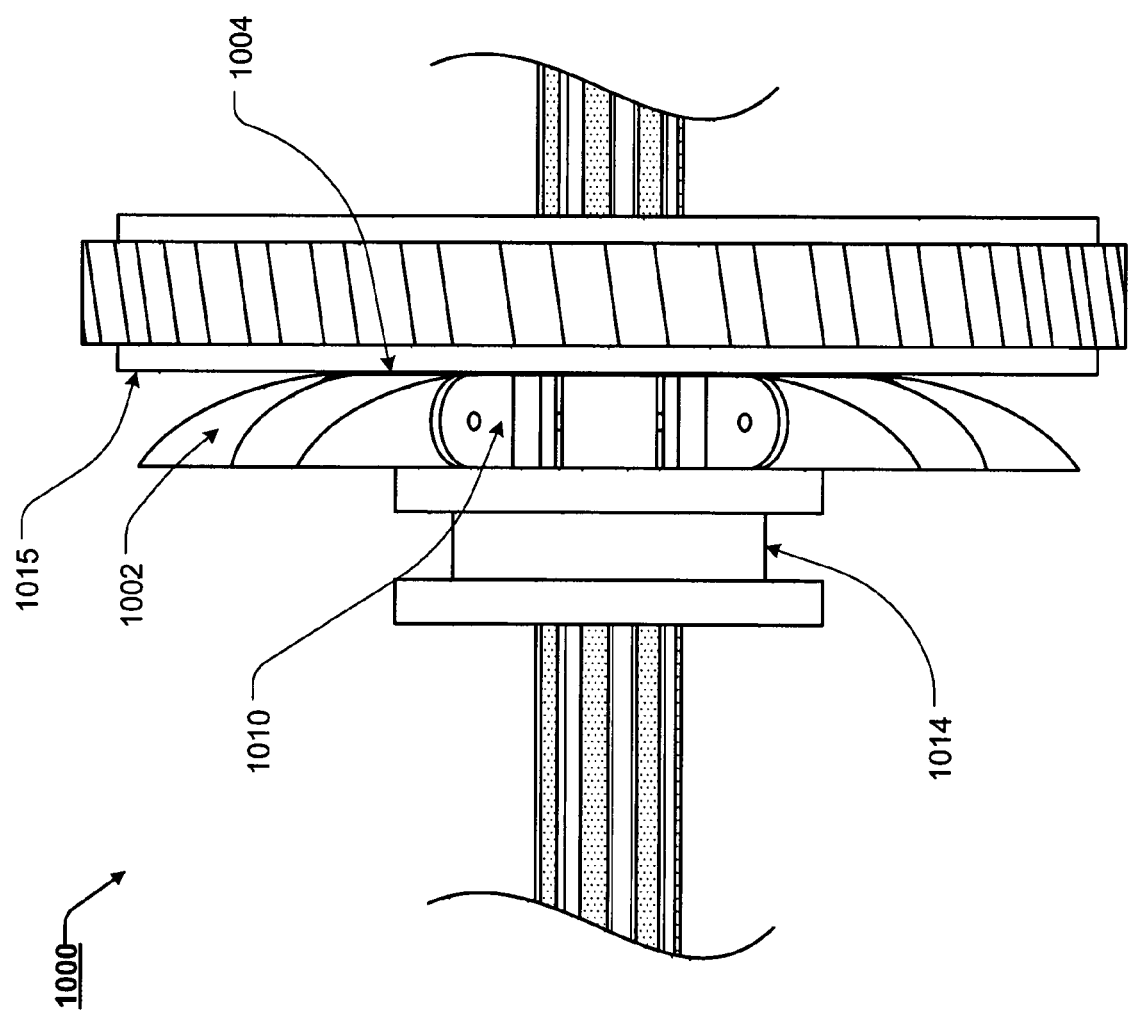
FIG. 2C illustrates a side elevation view of a first exemplary embodiment of a synchronizing clutch according to this invention, wherein the synchronizing clutch component carrier is illustrated in a final engagement position.

Turning now to the drawing figures, FIGS. 1A-1B illustrate a first exemplary embodiment of a synchronizing clutch 1000 according to this invention, wherein the friction members 1002 of the synchronizing clutch 1000 is illustrated in a neutral position and in a final engagement position, respectively. FIGS. 2A-2C illustrate the basic engagement progression of the synchronizing clutch 1000, wherein the synchronizing clutch component carrier 1010 is illustrated in a neutral position, an intermediate position, and a final engagement position, respectively. FIG. 3A illustrates a side elevation view of a first exemplary embodiment of a friction member 1002 according to this invention.

As shown in FIGS. 1A-3A, the synchronizing clutch 1000 comprises at least some of a component carrier 1010 and a plurality of friction members 1002, pivotably coupled, via rotation pins 1006, and radially extending from corresponding wall recesses 1017 of the component carrier 1010.

The component carrier 1010 includes a central aperture 1110 formed therethrough. The central aperture 1110 is formed such that the component carrier 1010 is able to accept a splined shaft 1001 therethrough and interact with the splined shaft 1001.

The interaction between friction member component carrier 1010 and splined shaft 1001 remains true to the spline/key design of the splined shaft 1001, allowing the transfer of rotation between splined shaft 1001 to friction member component carrier 1010 while also allowing component carrier 1010 to slide axially along splined shaft 1001 as the component carrier 1010 and 1007 are brought into frictional and rotational interaction.

The component carrier 1010 of the synchronizing clutch contains a plurality of walled recesses 1017 (cut outs, or other such structures for friction members to reside) around the outer rim. A mounting aperture 1018 is formed through each walled recesses 1017 within component carrier 1010 so as to receive a rotation axis/pin 1006. Mounted on each rotation pin 1006 is a friction member 1002 so as to extend radially from the component carrier 1010 within walled recesses 1017.

Proximate a base of each friction member 1002 is a mounting aperture 1008 with an optional clearance fit tolerance, or some other optional rotating bearing, to allow pivoting of each friction member around their respective rotation pins (however it should be noted that the clearance fit or bearing may optionally be between mounting aperture 1008 and rotation pin 1006). A torque, as described with reference to FIG. 4 will force the friction member 1002 into interaction of its contact surface 1011 with the friction surface 1015 of the opposing friction plate 1007.

The surface 1015 of friction plate 1007 may optionally be reinforced, or contain a separate plate, with a friction material formed of, for example, a resin-type material, hardened metal or ceramic material.

FIG. 2A illustrates synchronizing clutch mounted component carrier 1010 in a neutral position prior to the first instance of frictional interaction between friction members 1002 and friction surface 1015 of opposing friction plate 1007.

During operation, as the actuating fork/arm (not illustrated), which would ride, possibly with a bearing, in groove 1014, moves the component carrier 1010 axially along splined shaft 1001 from the neutral position (as illustrated in FIG. 2A) towards the opposing friction plate 1007 and its friction surface 1015, the contact surfaces 1011 of the friction members 1002 begin to make contact with the friction surface 1015 (as illustrated in FIG. 2B). This initiates the frictional gripping forces, which begin rotating the component carrier 1010 and friction plate 1007 together.

FIG. 2B illustrates the component carrier 1010 after it has been axially actuated towards contact with opposing friction plate 1007 at an intermediate point in the carrier's 1010 travel. Note that the interaction of the curved contact surface 1011 between friction members 1002 and friction surface 1015 at tangent engagement surface 1004. A torque generated (as described with reference to FIG. 4) around rotation pin 1006 in conjunction with the lever arm created between the rotation pin 1006 and engagement surface 1004 creates the engagement friction. This is the friction that will synchronize the differing rotations between component carrier 1010 and friction plate 1007.

As the component carrier 1010 continues axially along splined shaft 1001 towards friction plate 1007, the friction members 1002 rotate outwardly about rotation pins 1006. Between the neutral position and the point at which the system is fully engaged, each friction member 1002 will rotate about their rotation pin 1006 and adjust their frictional engagement surface 1004 on the friction surface 1015 based on the amount of travel accomplished by the actuating mechanism and thus the travel of component carrier 1010. When the system is fully engaged (as illustrated in FIG. 2C), the friction members 1002 reach a point in their rotation where they are out of the way of both the actuation member (represented by groove 1014), and the final engagement components (either engagement of the dog teeth 1003 or locking of a friction medium).

FIG. 2C illustrates the component carrier 1010 at its final engagement between component carrier 1010 and opposing friction plate 1007 with the friction members 1002 rotated into their final position.

FIGS. 3A-3E illustrate a variety of exemplary, nonlimiting embodiments of potential friction members usable with the synchronizing clutch of the present invention. It should be appreciated that one or more of the various friction members may be employed depending on the rotational/load situation and manufacturer's choice of components/materials/specific geometry.

FIG. 3A illustrates a basic friction member 1002 having a simple curved contact surface 1011 for the opposing friction media to interact with as the friction member resistibly rotates about mounting aperture 1008. The final curvature function of the surface of friction member 1002 will vary based on size/material constrictions and the force required relative to axial movement of the component containing the friction members (i.e. the torque/rotational situation).

Figure 3B:
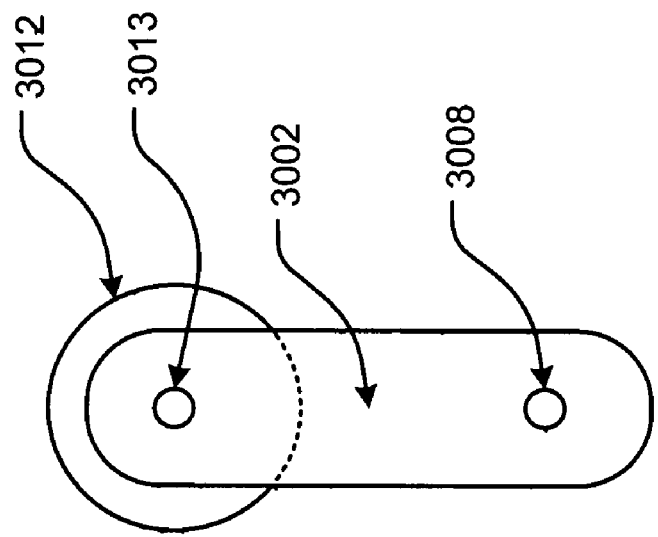
FIG. 3B illustrates a side elevation view of a second exemplary embodiment of a friction member according to this invention.
Figure 3A:
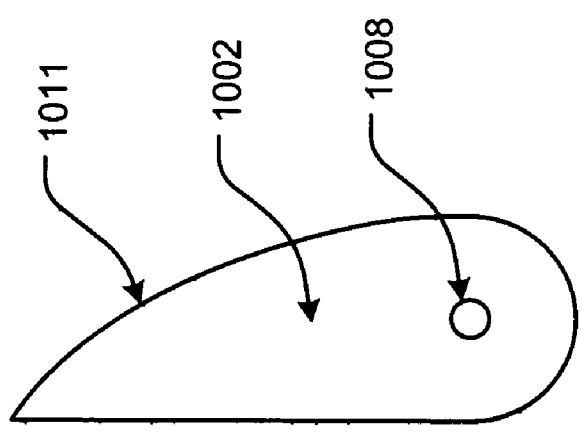
FIG. 3A illustrates a side elevation view of a first exemplary embodiment of a friction member according to this invention.

FIG. 3B illustrates an alternate embodiment of a friction member, which utilizes a rolling friction roller 3012, mounted proximate its center to a friction member/lever arm 3002 connected to the rotating aperture 3006.

As the friction roller 3012 moves axially (with the rest of the component and carrier) and makes contact with the opposing component's friction media, the friction roller 3012 rotates about rotation pin 3013, effectively reducing the downward (radial) friction on/from an opposing friction plate (not shown) while still transmitting the rotational friction required for operation. The friction roller 3012 may incorporate a rigid cylinder structure for durability, or of a more malleable form so that the tangent friction face of the friction roller 3012 may become slightly flattened (at the expense of some force) into the friction plate (not shown) so as to increase contact area.

FIG. 3C illustrates a friction roller 3012' having a combination of friction rollers 3012' and contact surface 3011'. By patterning multiple friction rollers 3012' and roller rotation points 3013' about the curved contact surface 3011', additional friction tangent points are provided to engage a friction plate while also reducing unneeded radial friction. Note that the friction rollers 3012' of this variation may be of rigid or malleable form as described with reference to FIG. 3B.

FIG. 3D illustrates a lever arm/member 3002". The lever arm/member 3002" is similar to the friction roller 3012 of FIG. 3B, but instead of a single roller to reduce radial friction a small plate 3023" has is utilized to increase overall surface area and friction. It should be appreciated that rotation points 3013" of the plate 3023" adds another rotation pin joint to the friction arm/member system, allowing for another optional energy device (i.e. spring) 3005". This is a cost to radial friction, but a gain to the friction, which exists between the friction member/multiple friction member synchronizing clutch assembly and friction plate, thus aiding rotation synchronization.

FIG. 3E illustrates a lever arm/member 3002'''. The lever arm/member 3002''' is similar to the lever arm/member 3002" of FIG. 3D, however, as illustrated in FIG. 3E, the lever arm/member 3002''', friction rollers 3012', either rigid or flexible, have been added to the friction plate 3023''' to give the lever arm/member 3002''' the same advantage as the other exemplary roller friction members.

Figures 3F, 3G:
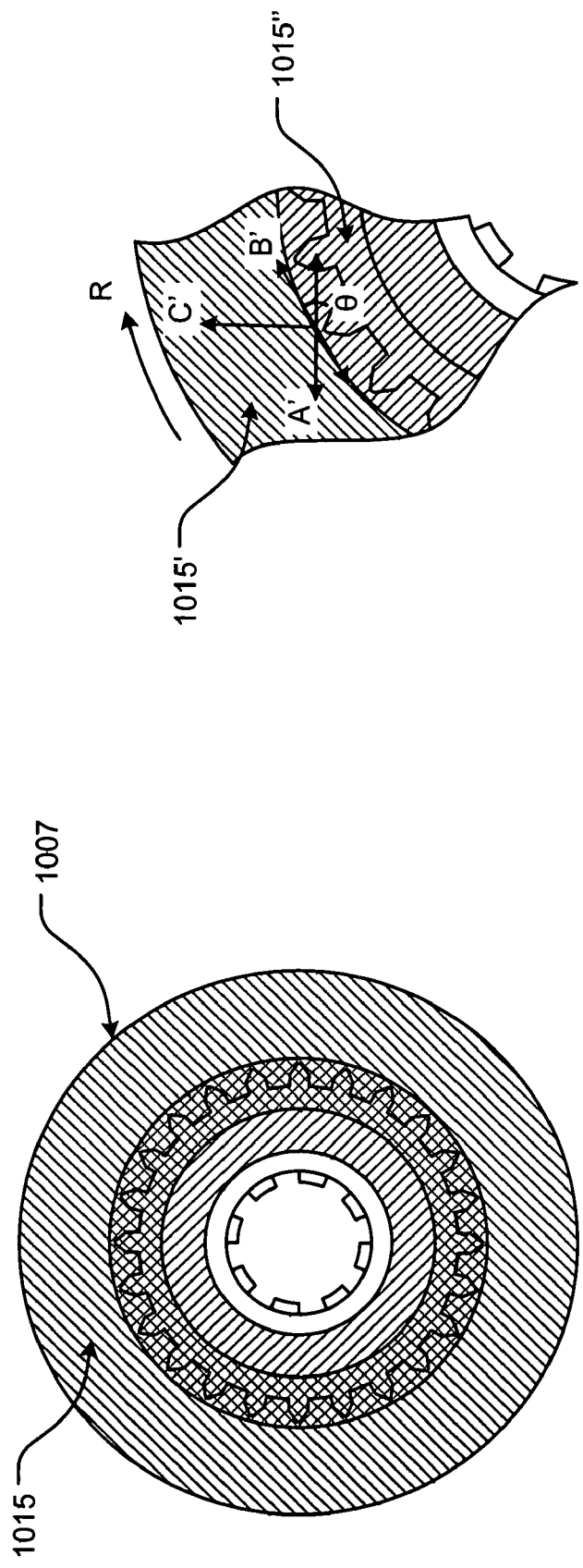
FIG. 3F illustrates exemplary opposing friction surface attributes according to this invention.
FIG. 3G illustrates exemplary opposing friction surface attributes with frictionally complimentary geometry according to this invention.
Figure 3I:
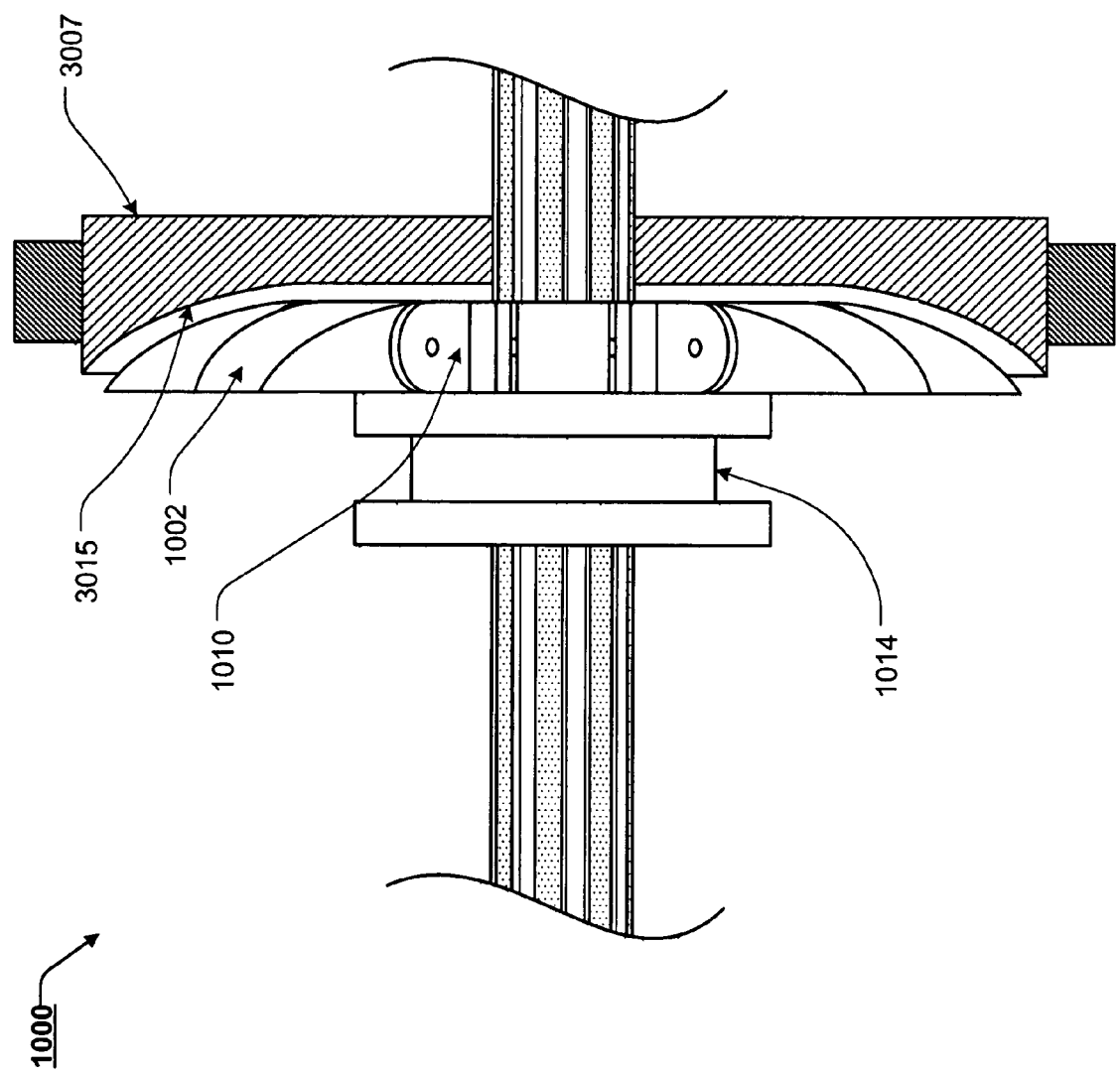
FIG. 3I illustrates exemplary interaction of a complementary curved friction plate surface with the curved surfaces of friction members, wherein the synchronizing clutch component carrier is illustrated in a final engagement position.

FIGS. 3F and 3G illustrate how the friction plate 1007 may optionally be broken up into different zones, as shown by differing marks, of friction material/interaction based on radial location. As the (vertically mounted) friction members rotate, they move along the radii of the friction plate 1007. This allows the partitioning of different radial friction material bands on the surface of the friction plate to allow for different areas of frictional properties.

FIG. 3G illustrates force componentization patterns 1015' and 1015" embedded, or in some other way added to the friction plate surface material, which guides the frictional contact forces between the friction member 1002 and friction plate through force vector componentization. Like the different friction bands described in FIG. 3G, these patterns 1015' and 1015" are a function of radial location. Componentization occurs because of the angle θ, which is formed by the intersection of the lines of action: radius dependant tangential contact line A' and friction surface groove line B'. This instigates slightly different force vectors at the point of frictional contact along lines of action tangent line A' and radial line C' to possibly aid in engagement feedback, fine-tuning or wear control.

FIGS. 3F and 3G illustrate the potential interaction of a complementary curved friction plate surface 3015, with the curved contact surfaces 1011 of friction members 1002. This allows for more complete surface contact area (as opposed to a friction tangent or other such situation) between the curved surface 3015 of the friction plate 3007 and curved contact surface 1011 of the friction members 1002 as illustrated in FIG. 3G.

Figure 3K:
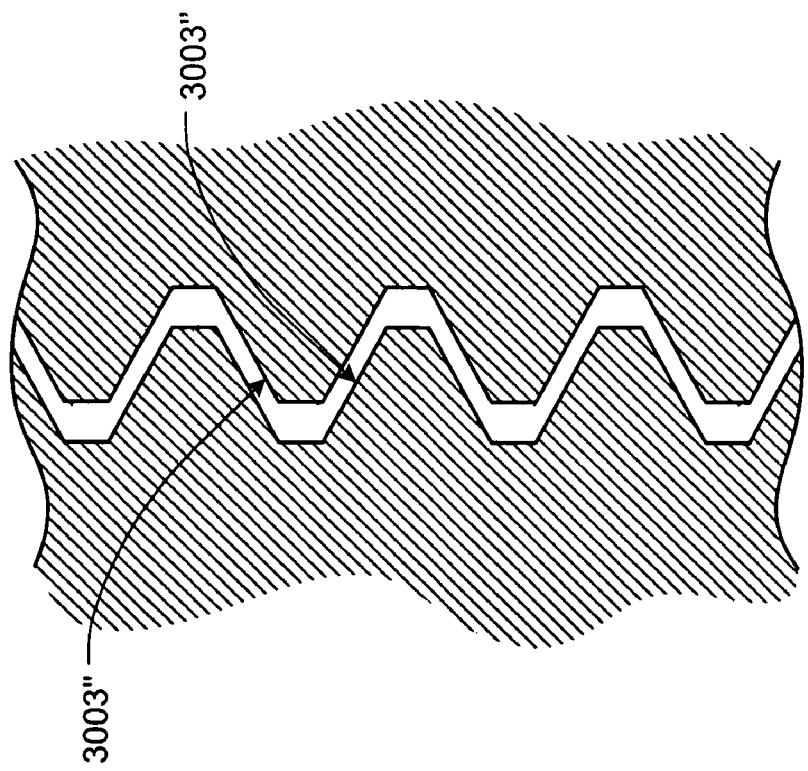
FIG. 3K illustrates an exemplary modified angled faced dog tooth according to this invention.
Figure 3J:
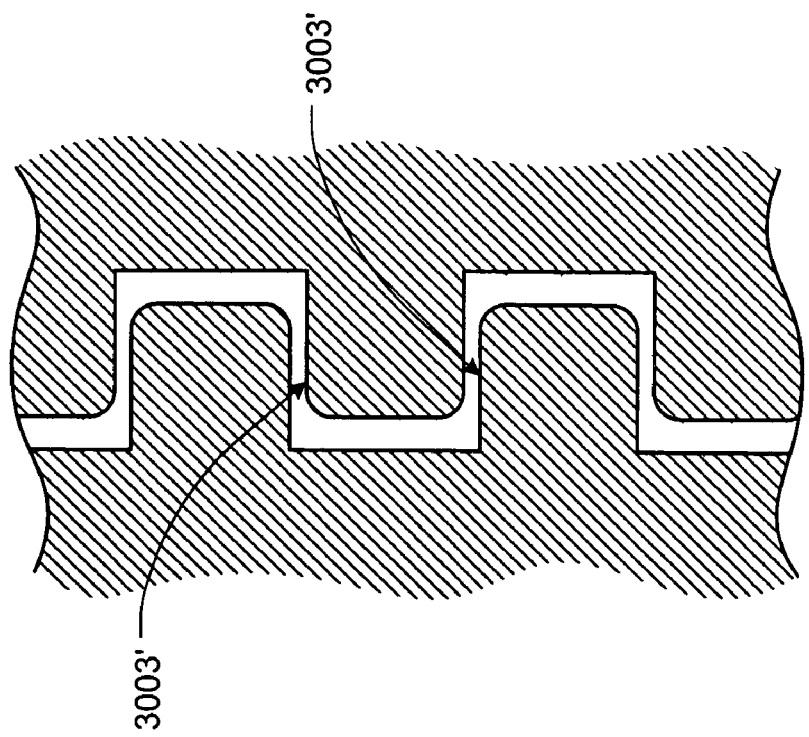
FIG. 3J illustrates an exemplary dog tooth.

FIGS. 3J and 3K illustrate the difference between a first exemplary dog tooth (as illustrated in FIG. 3J) and a second exemplary modified angled faced dog tooth (as illustrated in FIG. 3K). The first exemplary dog tooth has a contact face 3003' that is completely parallel with axis of rotation A (and thus perpendicular to the torque force vector), allowing all rotational force to be purely transmitted into engaged rotation with no force loss/distribution to vector componentization. This however makes axial movement (i.e.: engagement and disengagement) difficult because of the friction generated on the tooth's contact face, a result of no component losses.

By angling the contact face 3003" of the teeth (as illustrated in FIG. 3K) engagement and disengagement of the teeth is simplified because at least some of the frictional force vector associated with the contact face of the tooth has been split into components, only some of which operate along the rotation axis to lessen movement interference along said axis. However, because this ease comes from the force vector being componentized in the direction of rotation and along the rotation axis, an additional axial force may be required to keep the dog teeth engaged in the absence of complete friction force from the engagement of the dog tooth face.

FIGS. 4A-4E illustrate a variety of exemplary, nonlimiting embodiments of potential systems and/or methods for applying a torque and/or biasing force to a friction member 4002. It should be appreciated that while the friction member 4002 is illustrated as being similar to the friction member 1002, any of the friction members described and/or illustrated herein may be used in the various exemplary embodiments illustrated in FIGS. 4A-4E.

Figure 4B:
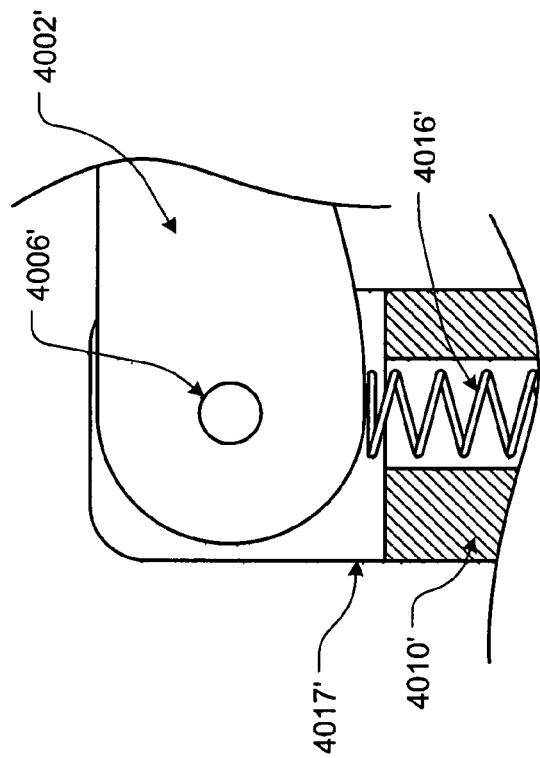
FIG. 4B illustrates a second exemplary embodiment of a friction member and torsion spring combination according to this invention.
Figure 4A:
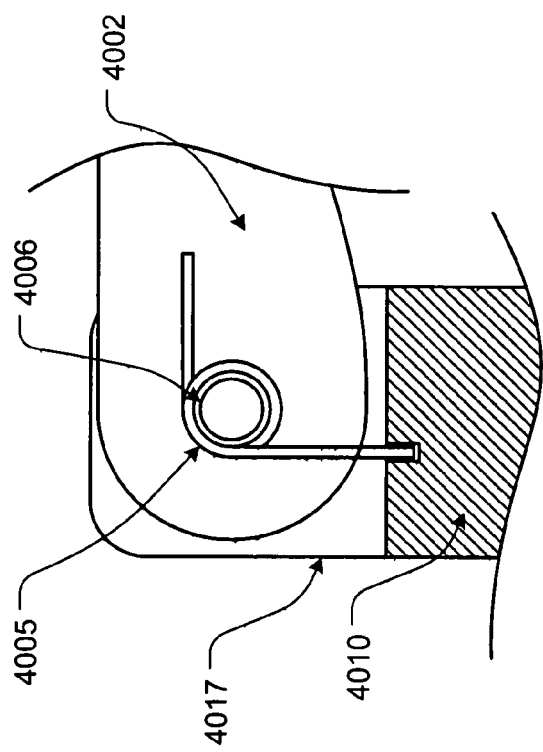
FIG. 4A illustrates a first exemplary embodiment of a friction member and torsion spring combination according to this invention.

As illustrated in FIG. 4A, a representative friction member 4002 is rotatably secured, via a rotation pin 4006, within a walled recess 4017 of a mounting component 4010. A torsion spring 4005, formed of a spring-biased material, acts around the rotation pin 4006 so as to bias the friction member 4002 relative to the mounting component 4010. The torsion spring 4005 provides the rotational resistance for friction member 4002 from which the component rotation inducing frictional force interaction is derived as member 4002 is rotated about rotation pin 4006.

FIG. 4B illustrates a representative friction member 4002' rotatably secured, via a rotation pin 4006', within a walled recesses 4017' of a mounting component 4010'. A compression spring 4016', formed of some spring-biased material, acting against the friction member 4002' and the mounting component 4010', so as to provide a biasing force to the friction member 4002' relative to the mounting component 4010'. The compression spring 4016' provides the rotational resistance for friction member 4002'.

Figure 4C:
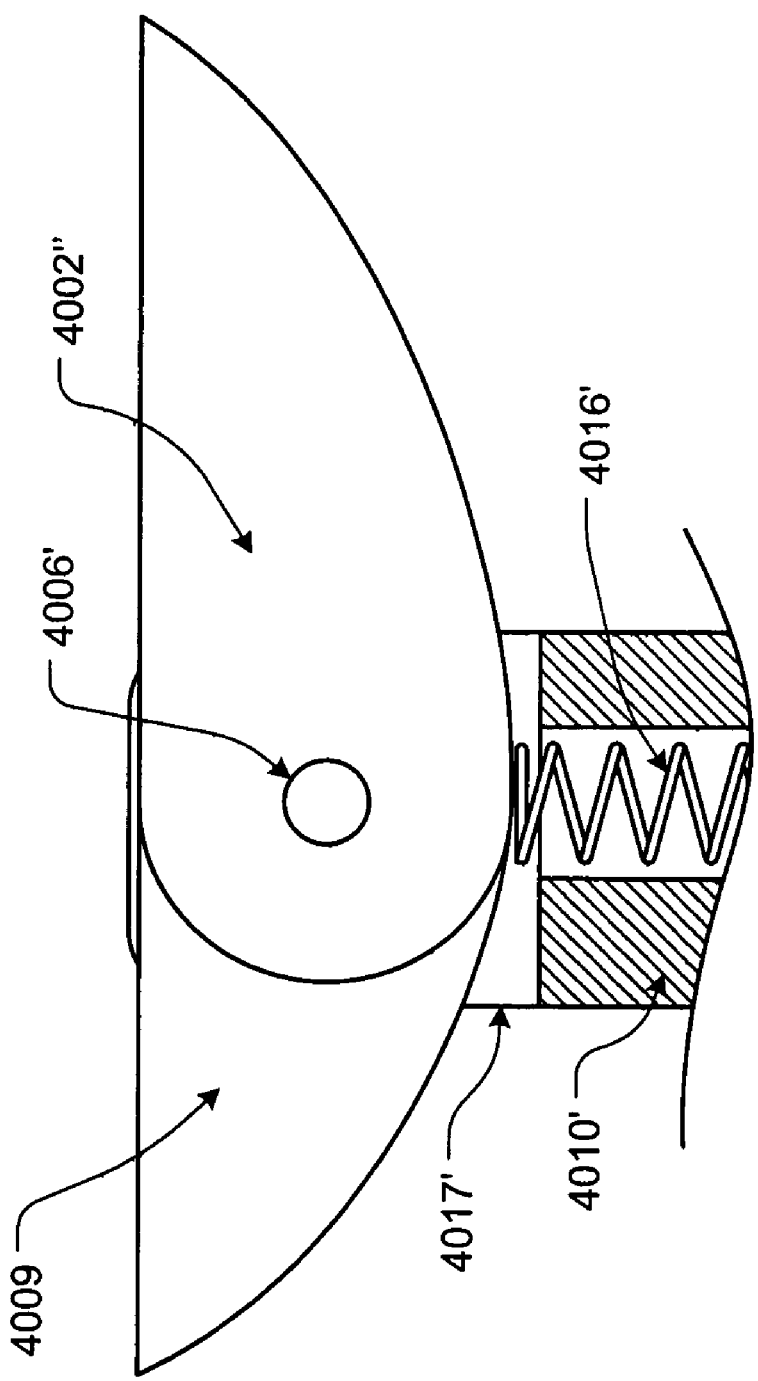
FIG. 4C illustrates a third exemplary embodiment of a friction member and torsion spring combination according to this invention.

FIG. 4C illustrates a cam/compression spring method of generating a torque within a representative friction member 4002" rotatably secured, via a rotation pin 4006', within a walled recesses 4017' of a mounting component 4010'. The friction member 4002" and compression spring 4016' do not initially interact except to hold the friction member 4002" in place. As friction member 4002" rotates about rotation pin 4006' (because of being axially acted on by the actuation of the synchronizing clutch), cam lobe 4009 depresses compression spring 4016' thus instigating a torque to the friction member 4002' (i.e. a lever system with spring 4016' and cam lobe 4009 as one force/arm, 4006' as the fulcrum and member 4002' and the force from the friction plate interaction as the other arm/force).

Figure 4E:
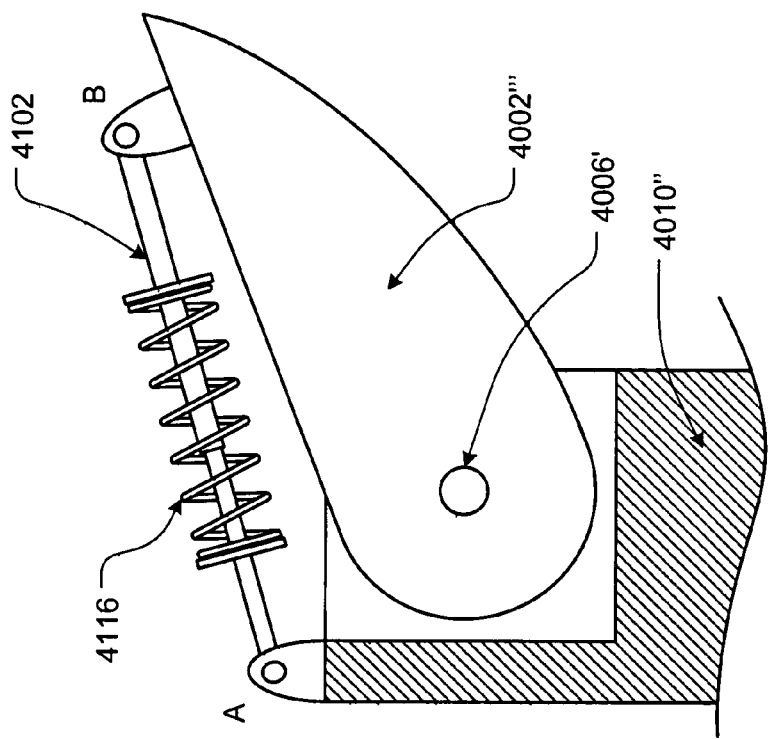
FIG. 4E illustrates the fourth exemplary embodiment of a friction member and torsion spring combination according to this invention, wherein the friction member is illustrated in an intermediate position.
Figure 4D:
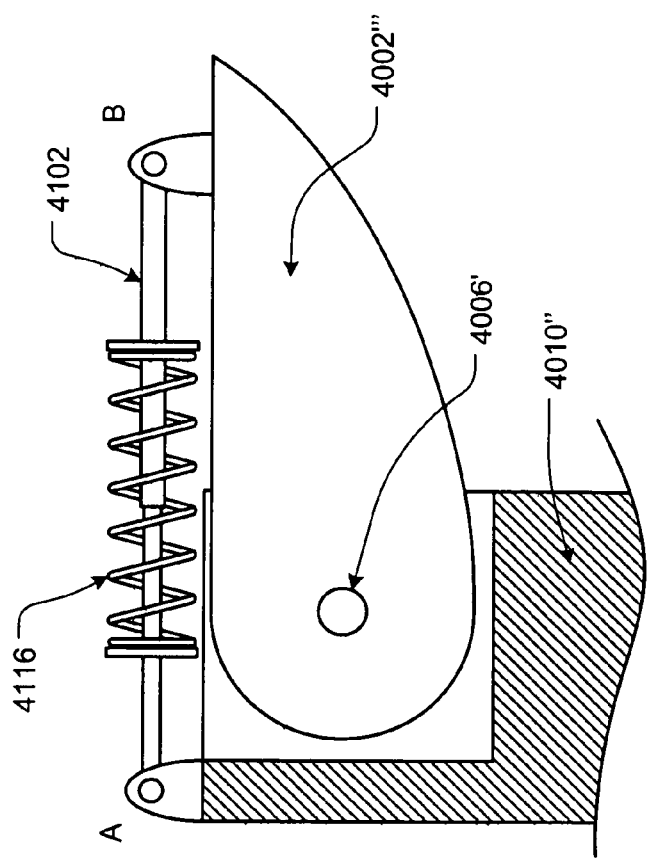
FIG. 4D illustrates a fourth exemplary embodiment of a friction member and torsion spring combination according to this invention, wherein the friction member is illustrated in a neutral position.

FIGS. 4D and 4E illustrate a system whereby torque may be derived from a linear spring linkage system. A linearly adjustable linkage 4102, anchored at point A on mounting component 4010'" and at point B on the friction member 4002'", is forced into its most open position by spring 4116.

FIG. 4E illustrates that as member 4102'" rotates around rotation pin 4006, linkage 4102 contracts, altering spring 4116 and resisting the rotation, thus instigating the required torque.

FIG. 5 illustrates an exemplary embodiment of a synchronizing clutch 5000 according to this invention. It should be appreciated that the elements of the synchronizing clutch 5000 operate similarly to corresponding elements of the synchronizing clutch 1000. However, as illustrated in FIG. 5, the friction members 5002 of the synchronizing clutch 5000 interact with an opposing friction plate 5007.

The surface 5015 of friction plate 5007 may optionally be reinforced, or contain a separate plate, with a friction material formed of, for example, a resin-type material, hardened metal or ceramic material. During operation, as the actuating fork/arm (not illustrated), which would ride, possibly with a bearing, in groove 5014, moves the component carrier 5010 axially along splined shaft 5001 from the neutral position towards the opposing friction plate 5007 and its friction surface 5015, the friction member's 5002 contact surface 5011 begin to make contact with the friction surface 5015. This initiates the frictional gripping forces, which begin rotating the component carrier 5010 and friction plate 5007 together. As the component carrier 5010 continues axially along splined shaft 5001 towards friction plate 5007, the friction members 5002 rotate outwardly about rotation pins 5006.

Between the neutral position and the point at which the system is fully engaged (as illustrated in FIG. 5), each friction member 5002 will rotate about their rotation pin 5006 and adjust their frictional engagement surface 5004 on the friction surface 5015 based on the amount of travel accomplished by the actuating mechanism and thus the travel of component carrier 5010. When the system is fully engaged, the friction members 5002 reach a point in their rotation where they are out of the way of both the actuation member (represented by groove 5014) and the final engagement components (either engagement of dog teeth or locking of a friction medium).

Figure 6:
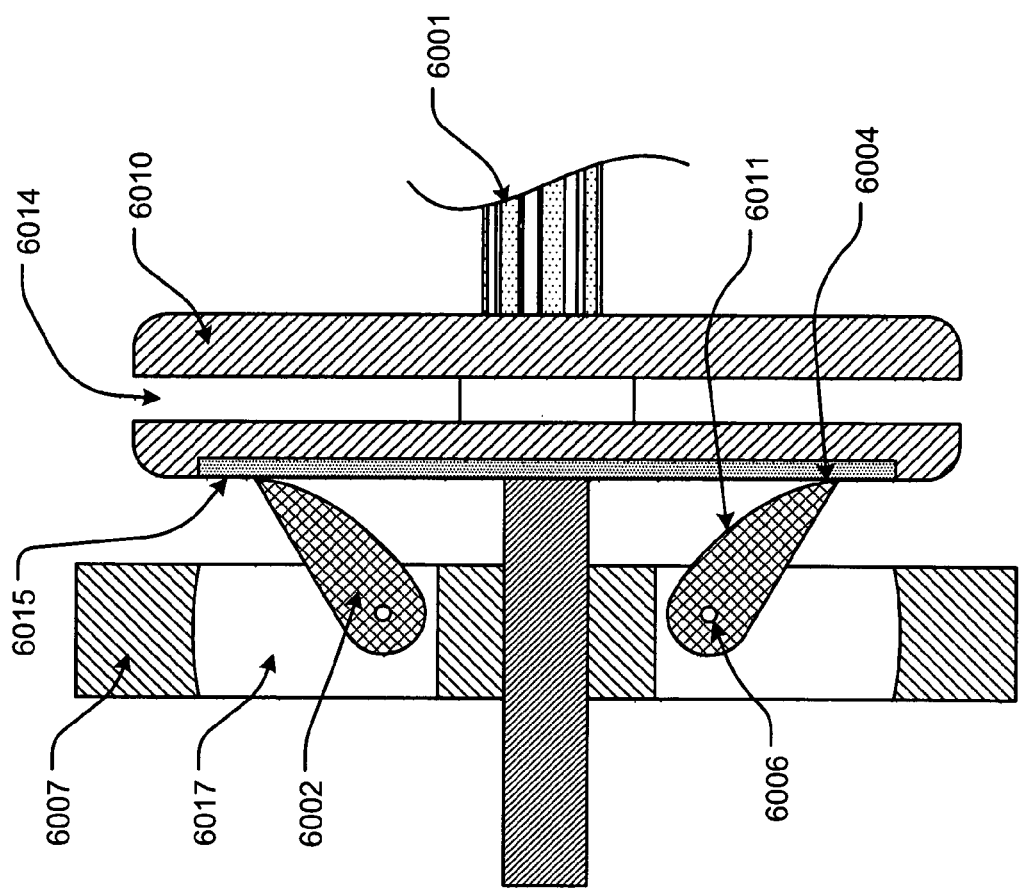
FIG. 6 illustrates an additional exemplary embodiment of a synchronizing clutch according to this invention, wherein the synchronizing clutch component carrier is illustrated in an intermediate position.

FIG. 6 illustrates an exemplary embodiment of a synchronizing clutch 6000 according to this invention. It should be appreciated that the elements of the synchronizing clutch 6000 operate similarly to corresponding elements of the synchronizing clutch 1000.

As illustrated in FIG. 6, the interaction between the collar 6010 and splined shaft 6001 remains true to the spline/key design, allowing the transfer of rotation from splined shaft 6001 to collar 6010 while also allowing collar 6010 to slide axially along the splined shaft 6001 as the system is brought to engagement. The surface 6015 of collar 6010 may optionally be reinforced, or contain a separate plate, with a friction material made of possibly, but not limited to, a resin-type material, hardened metal or ceramic material. This is the friction surface 6015 for the friction members 6002 to engage as they are introduced to the collar 6010.

The opposing friction plate 6007 has a circular pattern of cut extruded sections 6017. These sections will act as walled recesses for the friction members 6002 in the fully rotated position.

Proximate a base of each friction member 6002 is a aperture 6006 with a clearance fit tolerance, or some other form of rotating bearing, to allow pivoting of each friction member around its respective rotation pins.

A torque as described with reference to FIG. 4 will force friction member 6002 into a position in which its contact surface 6011 interacts with friction surface 6015 of the collar 6010. As the actuation member (not illustrated but would reside in 6014) moves the collar 6010 from the neutral position towards the opposing friction plate 6007, the friction member's 6002 contact surface 6011 begin to make contact with the friction surface 6015, initiating the frictional forces which begin rotating friction member mounted friction plate 6007 together with friction collar 6010.

As the collar 6010 continues axially along splined shaft 6001 towards friction plate 6007, the attached friction members 6002 rotate outwardly about rotation pins 6006. Between the neutral position and the point at which the system is fully engaged each friction member 6002 will rotate about their rotation pin and adjust their tangential engagement surface 6004 on collar 6010 friction surface 6015 based on the amount of travel accomplished by the actuating mechanism and thus the collar 6010.

When the system is fully engaged the friction members 6002 reach a point in their rotation where they are out of the way of the engagement of potential dog teeth, or friction plates.

FIGS. 7A-7D illustrate an exemplary embodiment of a synchronizing clutch 7000 according to this invention. It should be appreciated that the elements of the synchronizing clutch 7000 operate similarly to corresponding elements of the synchronizing clutch 1000.

As illustrated in FIGS. 7A-7D, a sliding outer component carrier 7020 containing friction member walled recesses 7017, mounting apertures 7018, rotation pins 7006, and friction members 7002 (as described herein with respect to FIG. 5). Outer component carrier 7020 connects in a spline fashion 7021 to inner collar 7010 allowing outer component carrier 7020 to slide independently of the inner collar 7010, yet rotate together. Outer component carrier 7020 is pre-loaded in an initial position by compression springs 7019 in which the dog teeth (hidden) of the inner collar 7010 will be covered as to not engage prematurely. After friction members 7002 complete a full rotation as and the friction has developed, as described with reference to FIGS. 2A-2C, inner collar 7010 moves under outer component carrier 7020 exposing dog teeth and allowing them to ultimately engage with opposing friction plate 7007 via dog tooth engagement apertures 7031. Outer component carrier 7020 also provides a plane in which an additional friction medium 7023 may be placed, allowing for more complete coupling of the collar assembly 7010/7020 and opposing friction plate 7007.

More specifically, FIG. 7A illustrates the inner/outer collar assembly 7010/7020 in an unengaged position. The position of the friction members 7002 prior to engagement with the friction surface 7015 of friction plate 7007 should be noted.

Figure 7B:
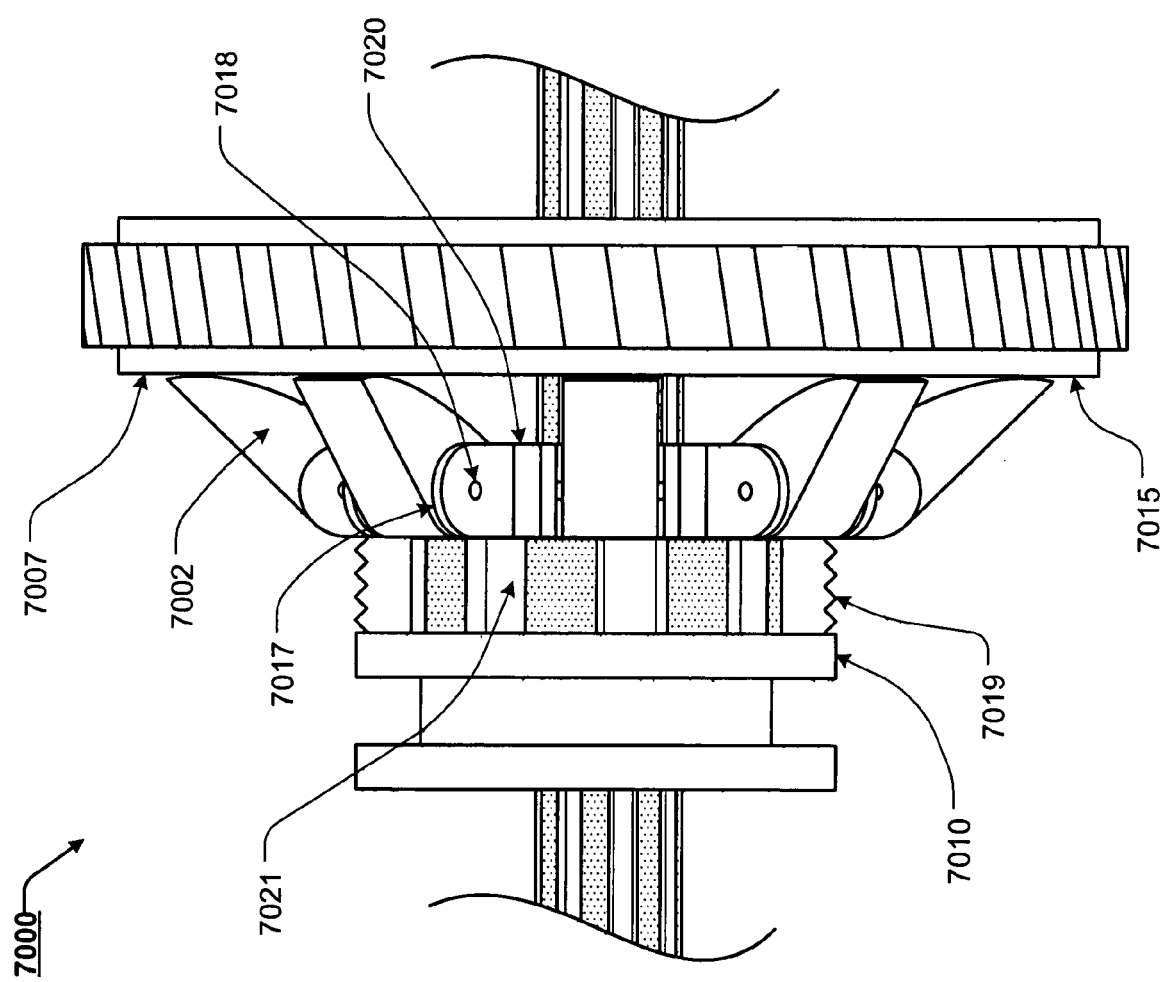
FIG. 7B illustrates a side elevation view of an exemplary embodiment of a synchronizing clutch according to this invention, wherein the exemplary synchronizing clutch component carrier is illustrated in a first intermediate position.

As illustrated in FIG. 7B, the assembly 7010/7020 has axially advanced towards friction plate 7007. The friction members 7002 are in an intermediate position of their rotation. Note that any dog teeth are still covered, preventing potential interaction, and compression springs 7019 are still in initial position.

Figure 7C:
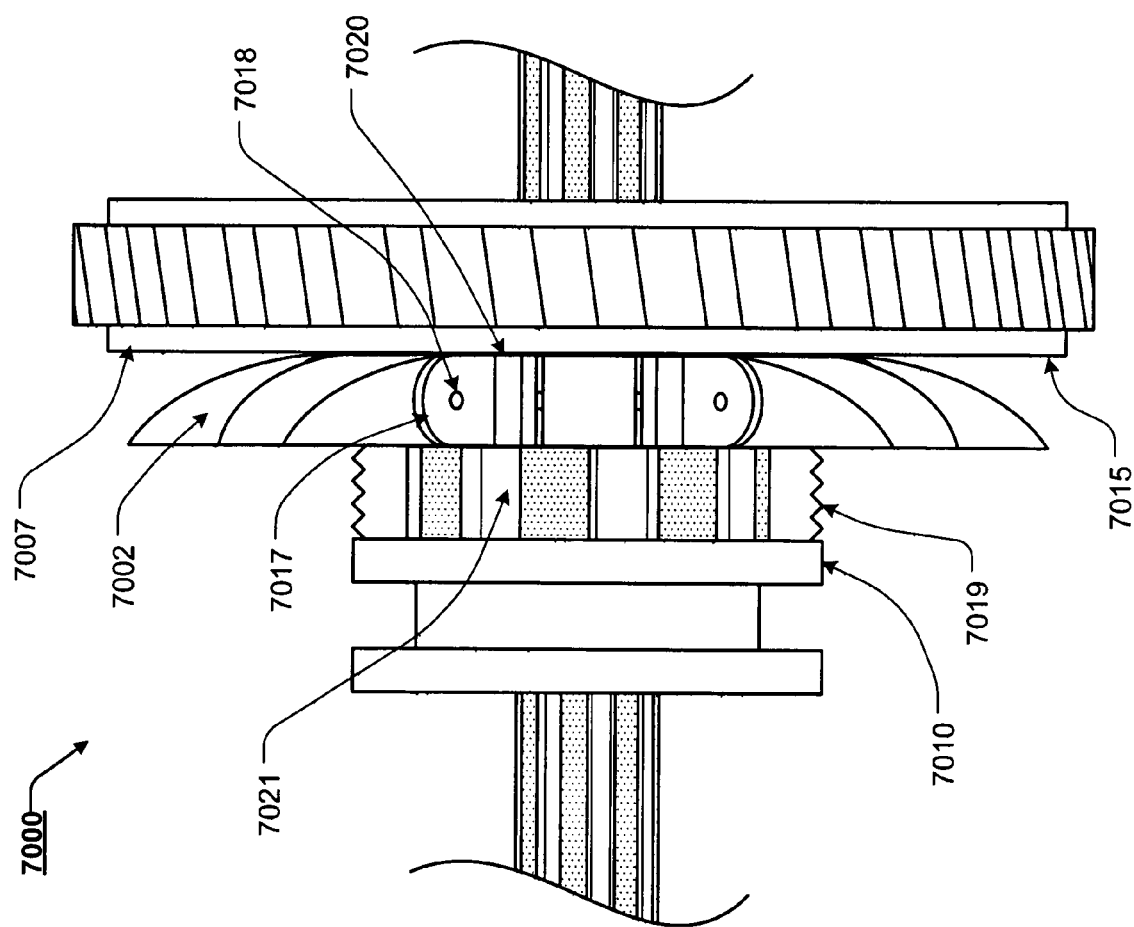
FIG. 7C illustrates a side elevation view of an exemplary embodiment of a synchronizing clutch according to this invention, wherein the exemplary synchronizing clutch component carrier is illustrated in a second intermediate position.

FIG. 7C illustrates the friction members after they have fully rotated. Once again, note the spring position and the fact that the dog teeth are still covered by the component carrier.

Figure 7D:
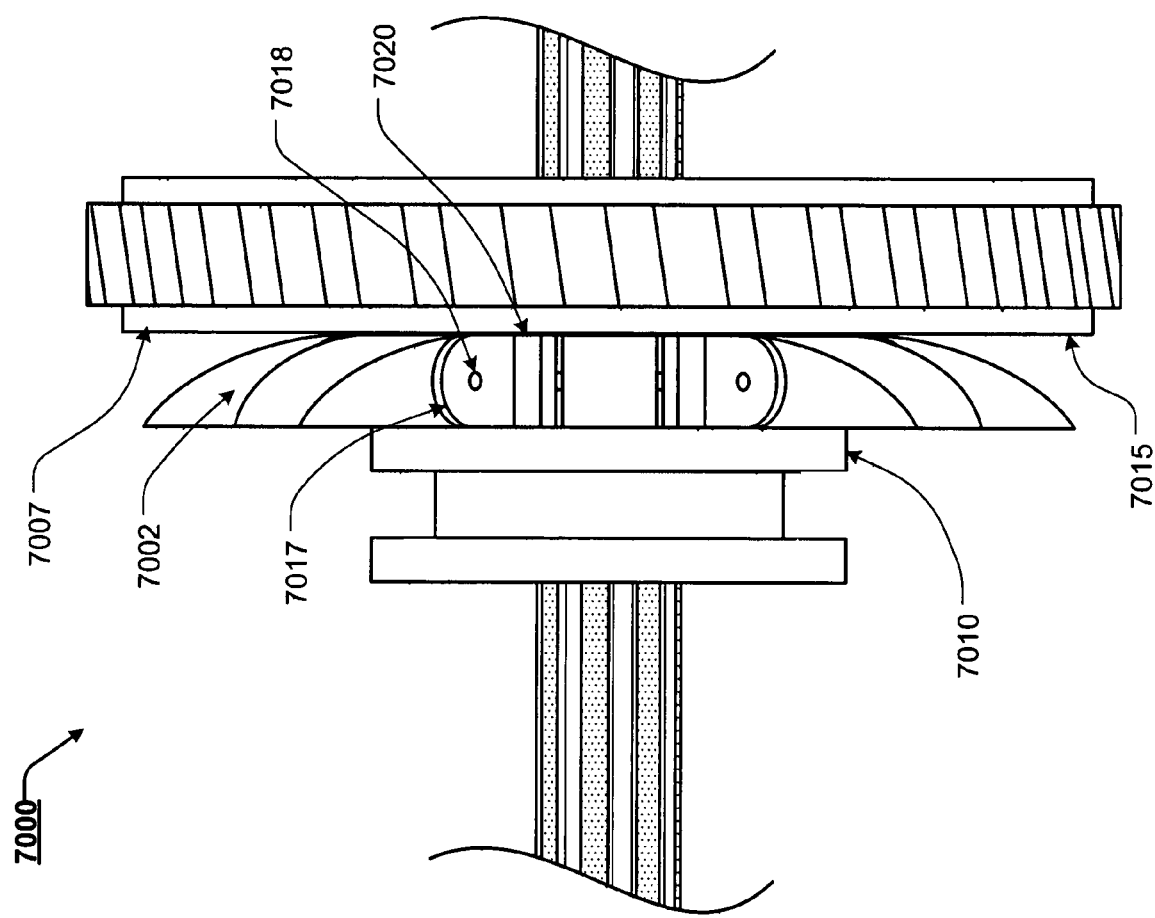
FIG. 7D illustrates a side elevation view of an exemplary embodiment of a synchronizing clutch according to this invention, wherein the exemplary synchronizing clutch component carrier is illustrated in a final engagement position.

FIG. 7D illustrates the friction members fully rotated and collar 7010 fully traversed under component carrier 7020. Compression springs 7019 are compressed and thus connection between dog teeth and receivers is complete.

FIGS. 8A-8D illustrate an exemplary embodiment of a synchronizing clutch 8000 according to this invention. As illustrated, a component carrier 8010 containing dog teeth 8003 and friction member walled recesses 8017 and is connected in a spline fashion to shaft 8001. As component carrier 8010 moves axially along splined shaft 8001, the friction members 8002 mounted within walled recesses 8017 interact with friction surface 8015 as described with reference to FIGS. 2A-2C. Friction surface 8015 is located on sliding plate 8030 and is mounted in a spline fashion 8021 to mounting hub 8032, which contains dog tooth receivers 8033. This spline connection allows the sliding plate 8030 to move axially along mounting hub 8032 while still transmitting rotation from said plate 8030. Sliding plate 8030 is pre-loaded in an initial position by compression springs 8019 thus preventing premature engagement of dog teeth 8003 and their receiving apertures 8033. After the friction members 8002 have completed their rotations, as described with reference to FIG. 2, the continued connection of component carrier 8010 and sliding plate 8030 moves said plate over inner hub 8032 thus allowing engagement of dog teeth 8003 and their receiving apertures 8033.

Figure 8A:
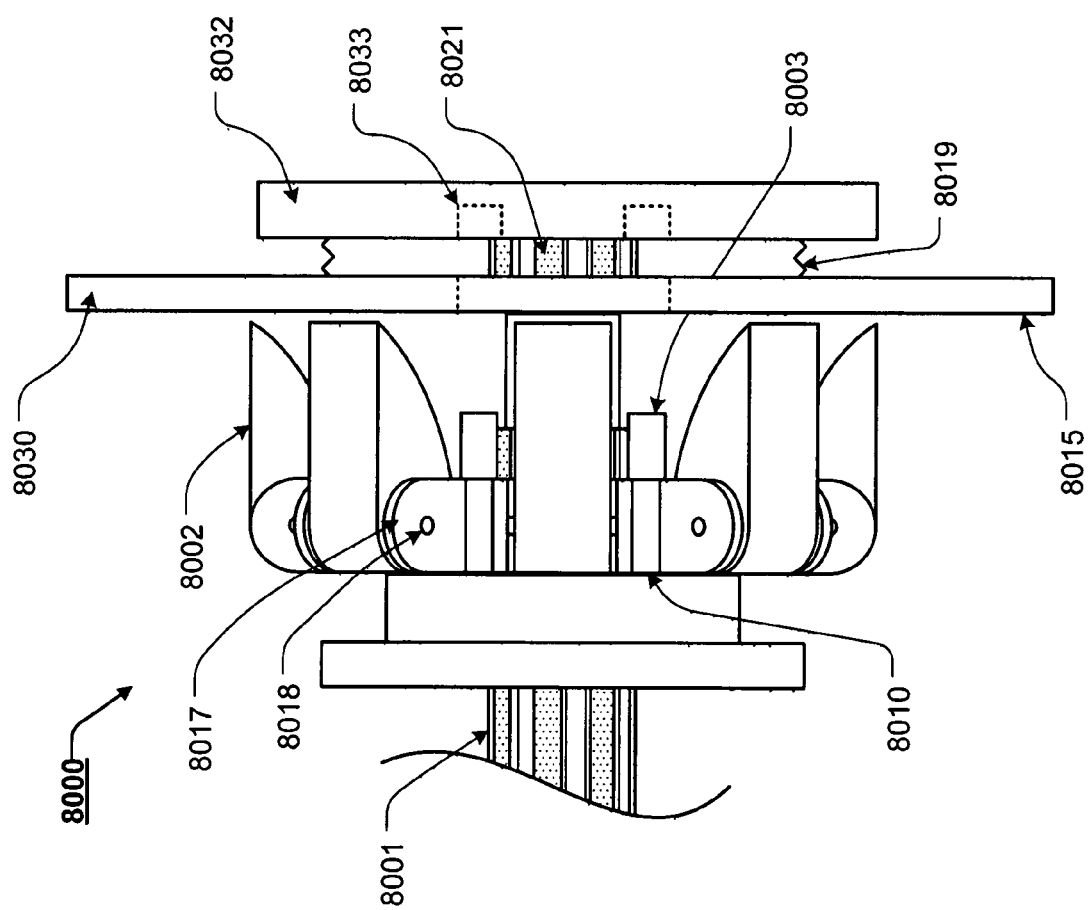
FIG. 8A illustrates a side elevation view of an exemplary embodiment of a synchronizing clutch according to this invention, wherein the exemplary synchronizing clutch component carrier is illustrated in a neutral position.

More specifically, FIG. 8A illustrates the position of the friction members 8002 prior to engagement with the friction surface 8015.

Figure 8B:
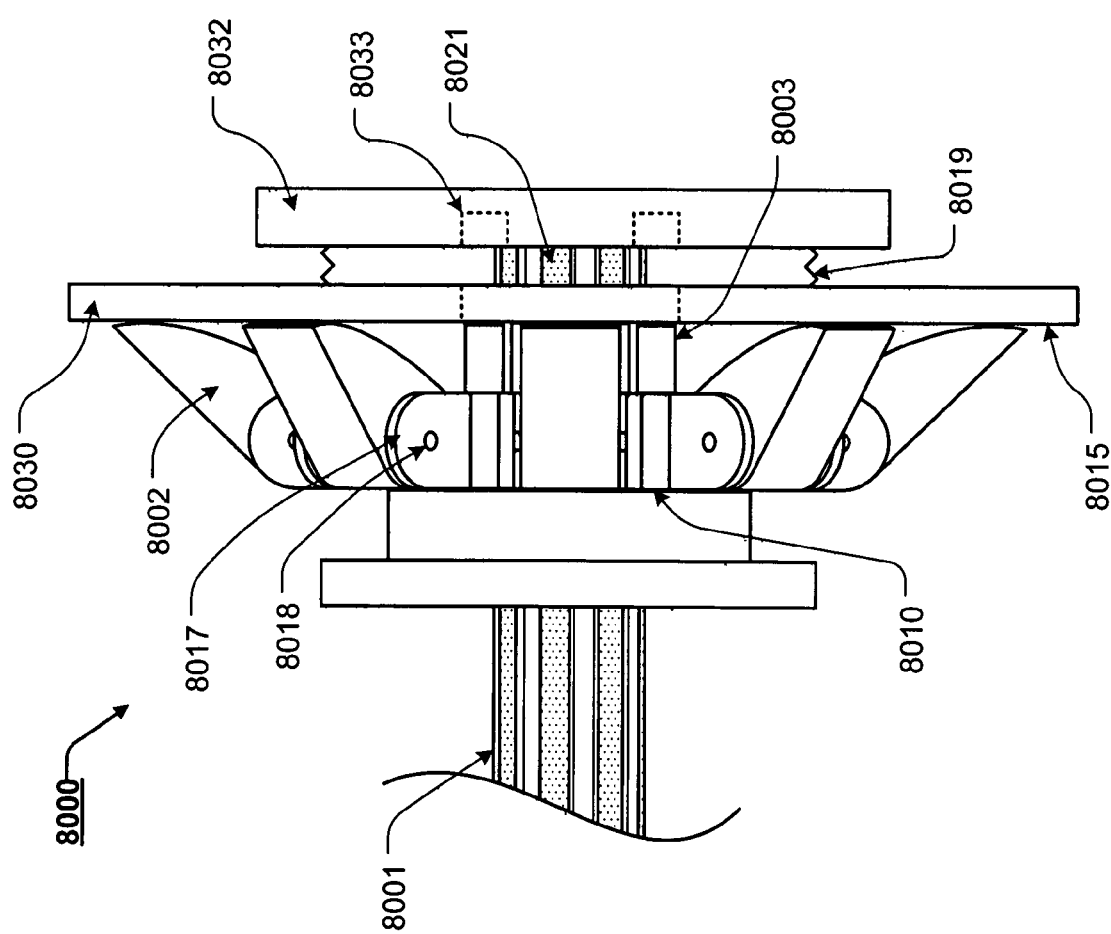
FIG. 8B illustrates a side elevation view of an exemplary embodiment of a synchronizing clutch according to this invention, wherein the exemplary synchronizing clutch component carrier is illustrated in a first intermediate position.

FIG. 8B illustrates the friction member 8002 in an intermediate position of their rotation. Note the dog tooth receivers are still covered and compression springs are still in initial position.

Figure 8C:
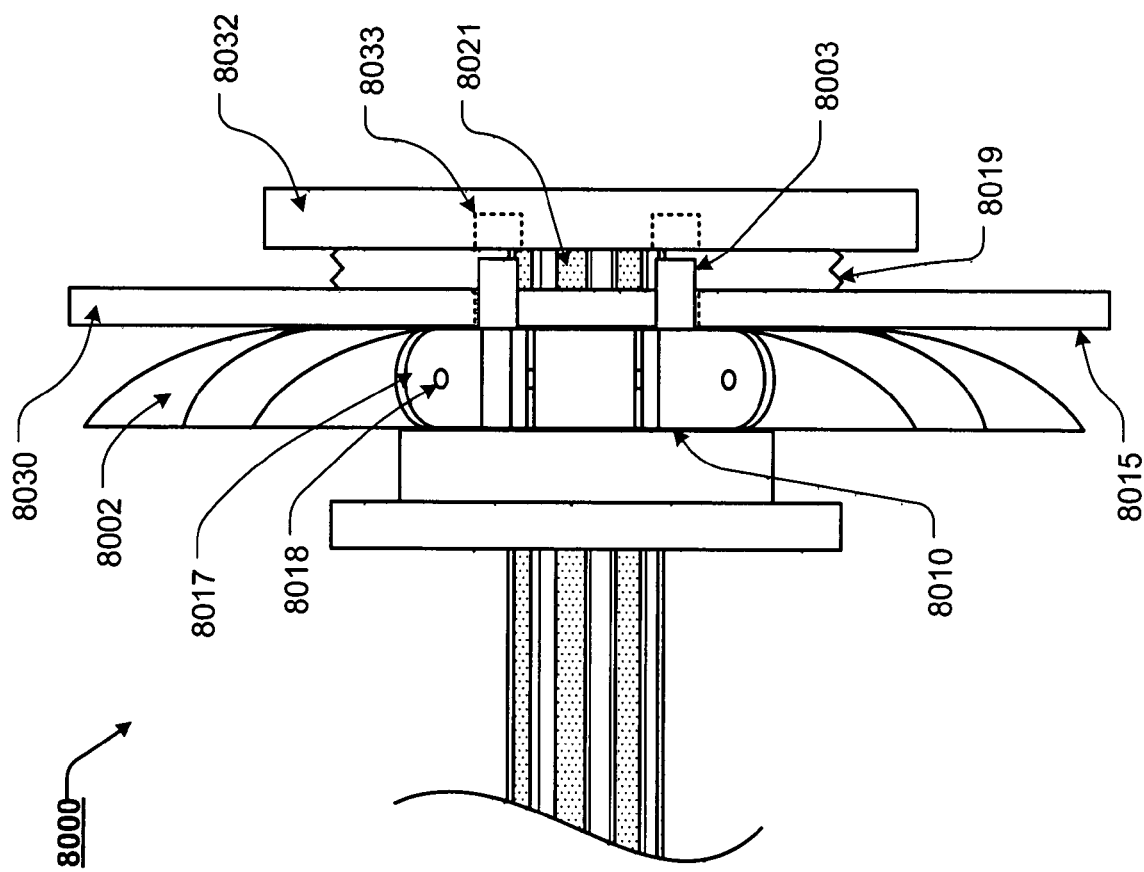
FIG. 8C illustrates a side elevation view of an exemplary embodiment of a synchronizing clutch according to this invention, wherein the exemplary synchronizing clutch component carrier is illustrated in a second intermediate position.

FIG. 8C illustrates the friction members 8002 after they have fully rotated; slider plate 8030 is still in its initial position.

Figure 8D:
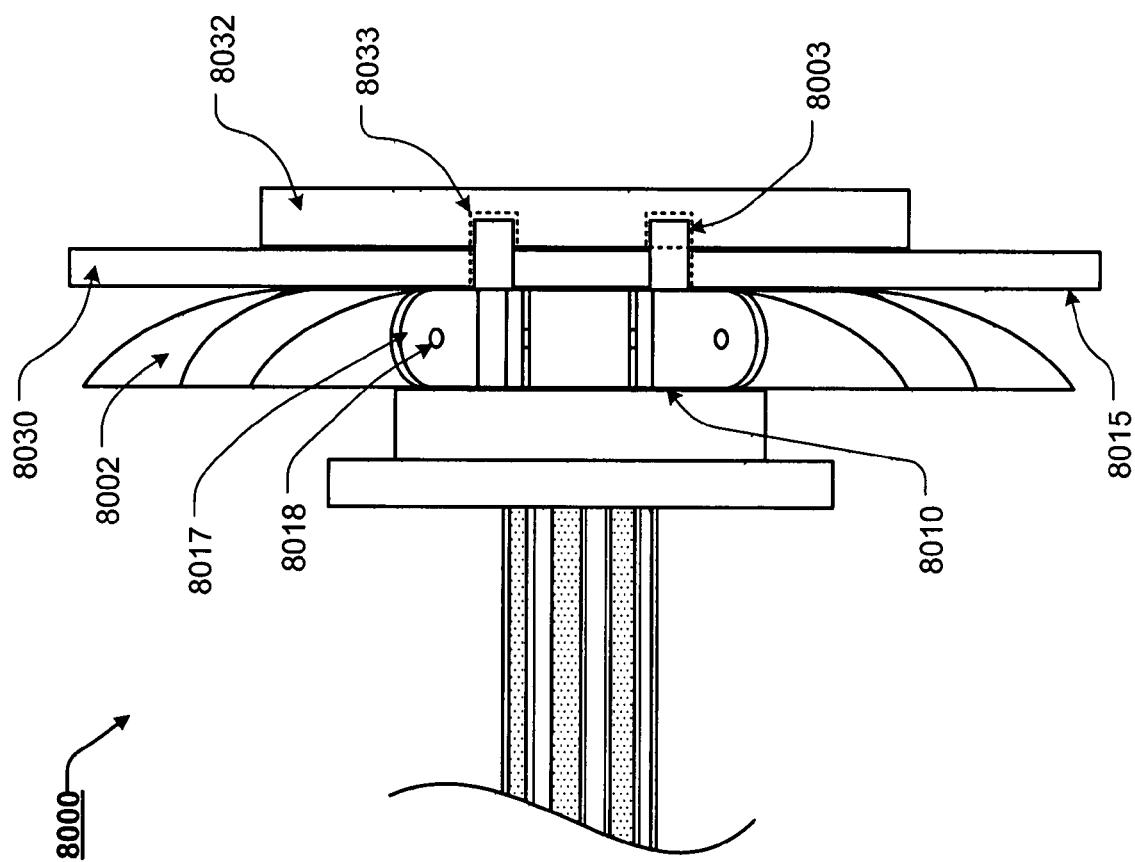
FIG. 8D illustrates a side elevation view of an exemplary embodiment of a synchronizing clutch according to this invention, wherein the exemplary synchronizing clutch component carrier is illustrated in a final engagement position.

FIG. 8D illustrates the friction members 8002 fully rotated and sliding plate 8030 fully traversed over inner hub 8032 and thus connecting dog teeth 8003 to receivers 8033.

FIG. 9 illustrates an exemplary embodiment of a "double sided" multiple friction member synchronizing clutch assembly synchronizing clutch 9000 according to this invention. As illustrated, the synchronizing clutch 9000 provides a multiple friction member synchronizing clutch that allows one shaft to synchronize two separate outputs (or, conversely, synchronize one output to two inputs) with a single connecting center hub.

The multiple friction member synchronizing clutch 9000 can service two separate outputs for a given input because its friction connection face may optionally be mirrored within the same component carrier along the shaft axis. This allows the doubly multiple friction member synchronizing clutch mounted component carrier to be actuated in either direction along the shaft axis to connect the rotations of one system or the other based on the (extreme) axial position of the synchronizing clutch center carrier.

As illustrated, the synchronizing clutch 9000 includes a least some of a first component carrier 9010 having a plurality of friction members 9002 extending radially therefrom. A second component carrier 9010', having a plurality of frictional members 9002' extending radially therefrom is coupled to the first component carrier 9010. The first component carrier 9010 and the second component carrier 9010' are coupled so as to form substantial mirror images of one another.

A groove 9014 is provided between the first component carrier 9010 and the second component carrier 9010' so as to allow an actuating fork/arm (not illustrated), which would ride, possibly with a bearing, in groove 9014, to move the coupled first component carrier 9010 and the second component carrier 9010' to engage either a friction surface 9015 of a first opposing friction plate 9007 or a friction surface 9015' of a second opposing friction plate 9007'.

While this invention has been described in conjunction with the exemplary embodiments outlined above, it is evident that many alternatives, modifications, and variations will be apparent to those skilled in the art. For example, this invention may optionally be used to not only synchronize rotations, but stop them as well, introducing uses within other facets of the realm of motion control. Any and all such adaptations and modifications should and are intended to be comprehended within the meaning and range of equivalents of the disclosed exemplary embodiments. It should also be appreciated that the multiple friction member synchronizing clutch has several important features, each with their own series of variations depending on the rotational/load situation and manufacturer's choice of components/materials/specific geometry.

It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A gear synchronizing system, comprising:
    a component carrier, wherein the component carrier comprises a plurality of walled recesses extending radially from an outer perimeter of the component carrier, wherein the component carrier includes a central aperture formed therethrough, wherein the central aperture is formed so as to accept a splined shaft therethrough and interact with the splined shaft, and wherein interaction between the component carrier and the splined shaft allows transfer of rotation between the splined shaft and the component carrier while also allowing the component carrier to slide axially along the splined shaft between a normal position and an engaged position relative to an associated friction plate;
    a plurality of friction members, wherein each friction member includes a contact surface, and wherein each friction member is pivotably coupled, via a rotation pin, within a respective one of said plurality of walled recesses of the component carrier, and wherein each friction member is pivotable between a normal position and an engaged position, such that when the component carrier is urged toward the associated friction plate, at least a portion of the contact surface of the friction members initially contacts a surface of the friction plate and, as the component carrier continues to be urged toward the associated friction plate, each friction member is rotated, about the friction member's associated rotation pin, such that at least a portion of the contact surface of each friction member continues to contact a surface of the friction plate; and
    at least one final engagement component associated with the component carrier, wherein the at least one final engagement component of the component carrier is capable of interacting with a final engagement component of a friction plate when the component carrier is in the engaged position and disengaging from the final engagement component of the friction plate when the component carrier is in the normal position, and wherein the at least one final engagement component associated with the component carrier comprises a friction medium.

2. The gear synchronizing system of claim 1, further comprising at least one groove associated with the component carrier for accepting an actuating fork for manipulating the component carrier to slide axially along the splined shaft from the normal position to the engaged position.

3. The gear synchronizing system of claim 1, wherein the plurality of walled recesses comprise cut outs extending inwardly from the outer perimeter of the component carrier.

4. The gear synchronizing system of claim 1, wherein each friction member is biased to the normal position.

5. The gear synchronizing system of claim 1, wherein a torsion spring, a compression spring, a linear spring linkage system, or an equivalent associated with each friction member biases the associated friction member to the normal position.

6. The gear synchronizing system of claim 1, wherein the surface of the friction plate is reinforced.

7. The gear synchronizing system of claim 1, wherein the surface of the friction plate comprises a separate plate.

8. The gear synchronizing system of claim 1, wherein the friction members include a curved contact surface.

9. The gear synchronizing system of claim 1, wherein the friction members comprise lever arms, wherein each lever arm includes a rolling friction roller rotatably coupled to the lever arm.

10. The gear synchronizing system of claim 1, wherein the friction members comprise lever arms, wherein each lever arm includes a plurality of rolling friction rollers rotatably coupled to the lever arm.

11. The gear synchronizing system of claim 1, wherein the friction members comprise lever arms, wherein each lever arm includes a curved contact surface, and wherein each lever arm includes a plurality of rolling friction rollers rotatably coupled to the lever arm.

12. The gear synchronizing system of claim 1, wherein the friction members comprise lever arms, wherein each lever arm includes a friction plate rotatably coupled to the lever arm and extending from the lever arm.

13. The gear synchronizing system of claim 1, wherein the friction members comprise lever arms, wherein each lever arm includes a friction plate rotatably coupled to the lever arm and extending from the lever arm, and wherein each friction plate includes a plurality of rolling friction rollers rotatably coupled to the friction plate.

14. The gear synchronizing system of claim 1, wherein the friction plate includes a curved friction plate surface, wherein a curvature of the curved friction plate surface corresponds to a curvature of the curved contact surface of the friction members.

15. The gear synchronizing system of claim 1, wherein the gear synchronizing system is coupled to a vehicle transmission having a vehicle transmission output such that when the component carrier is in the engaged position, sufficient frictional engagement is achieved between the at least one final engagement component and the friction plate to rotate the vehicle transmission output.

16. The gear synchronizing system of claim 1, wherein the friction plate includes a friction plate surface that comprises at least one force pattern.

17. The gear synchronizing system of claim 16, wherein the at least one force pattern guides frictional contact forces between the friction member and the friction plate through force vector.

18. The gear synchronizing system of claim 16, wherein different friction materials are used on the friction plate surface to create different radial friction zones.

19. A gear synchronizing system, comprising:
an externally splined inner collar wherein the inner collar includes a central aperture formed therethrough, wherein the central aperture is formed so as to accept a splined shaft therethrough and interact with the splined shaft, and wherein interaction between the inner collar and the splined shaft allows transfer of rotation between the splined shaft and the inner collar while also allowing the inner collar to slide axially along the splined shaft between a normal position and an engaged position relative to an associated friction plate;
an outer component carrier, wherein the outer component carrier comprises a plurality of walled recesses extending radially from an outer perimeter of the outer component carrier; wherein the outer component carrier includes a central aperture formed therethrough, wherein the central aperture is formed so as to accept the externally splined inner collar therethrough and interact with the splined inner collar, and wherein interaction between the outer component carrier and the splined inner collar allows transfer of rotation between the splined inner collar and the outer component carrier while also allowing the outer component carrier to slide axially along the splined inner collar between a normal position and an engaged position relative to the associated friction plate;
a plurality of friction members, wherein each friction member includes a contact surface, and wherein each friction member is pivotably coupled, via a rotation pin, within a respective one of said plurality of walled recesses of the outer component carrier, and wherein each friction member is pivotable between a normal position and an engaged position, such that when the outer component carrier is urged toward the associated friction plate, at least a portion of the contact surface of the friction members initially contacts a surface of the friction plate and, as the outer component carrier continues to be urged toward the associated friction plate, each friction member is rotated, about the friction member's associated rotation pin, such that at least a portion of the contact surface of each friction member continues to contact a surface of the friction plate; and
at least one final engagement component associated with the inner collar wherein the at least one final engagement component of the inner collar is capable of interacting with a final engagement component of a friction plate when the inner collar is in the engaged position and disengaging from the final engagement component of the friction plate when the inner collar is in the normal position.

20. The gear synchronizing system of claim 19, wherein the inner collar is biased to the normal position relative to the outer component carrier.

* * * * *

UNITED STATES PATENT AND TRADEMARK OFFICE
CERTIFICATE OF CORRECTION

PATENT NO. : 8,235,193 B2
APPLICATION NO. : 12/734349
DATED : August 7, 2012
INVENTOR(S) : John R. Otto et al.

Page 1 of 1

It is certified that error appears in the above-identified patent and that said Letters Patent is hereby corrected as shown below:

Col. 12, Line 40, delete "7031".

Signed and Sealed this
Ninth Day of October, 2012

David J. Kappos
*Director of the United States Patent and Trademark Office*